(12) United States Patent
Alagarsamy et al.

(10) Patent No.: US 11,528,520 B2
(45) Date of Patent: Dec. 13, 2022

(54) SYSTEMS AND METHODS FOR BANDWIDTH CONSUMPTION MANAGEMENT

(71) Applicant: Rovi Guides, Inc., San Jose, CA (US)

(72) Inventors: Ramesh Alagarsamy, Bangalore (IN); Madhusudhan Srinivasan, Bangalore (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 17/537,773

(22) Filed: Nov. 30, 2021

(65) Prior Publication Data

US 2022/0167030 A1 May 26, 2022

Related U.S. Application Data

(63) Continuation of application No. 16/768,236, filed as application No. PCT/US2017/064889 on Dec. 6, 2017, now Pat. No. 11,218,753.

(51) Int. Cl.
*H04N 21/24* (2011.01)
*H04L 67/306* (2022.01)
*H04N 21/262* (2011.01)
*H04N 21/2662* (2011.01)

(52) U.S. Cl.
CPC ....... *H04N 21/2402* (2013.01); *H04L 67/306* (2013.01); *H04N 21/2662* (2013.01); *H04N 21/26216* (2013.01)

(58) Field of Classification Search
CPC ......... H04N 21/2402; H04N 21/26216; H04N 21/2662; H04L 67/306

USPC .......................................................... 709/231
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,006,263 B2 | 8/2011 | Ellis et al. | |
| 8,046,801 B2 | 10/2011 | Ellis et al. | |
| 8,887,218 B2 | 11/2014 | Fielibert et al. | |
| 10,310,808 B2 * | 6/2019 | Foster | G06F 3/167 |
| 2002/0174430 A1 | 11/2002 | Ellis et al. | |
| 2004/0010585 A1 * | 1/2004 | Jones, Jr. | H04L 47/826 709/224 |
| 2005/0251827 A1 | 11/2005 | Ellis et al. | |
| 2008/0189388 A1 | 8/2008 | Khare et al. | |
| 2009/0144792 A1 * | 6/2009 | Fielibert | H04N 21/23608 725/116 |
| 2010/0153885 A1 | 6/2010 | Yates | |
| 2016/0142793 A1 | 5/2016 | Abrams | |
| 2017/0075740 A1 * | 3/2017 | Breaux | H04W 4/42 |
| 2017/0249192 A1 * | 8/2017 | Thompson | G06F 9/5038 |
| 2021/0127150 A1 | 4/2021 | Alagarsamy et al. | |

OTHER PUBLICATIONS

PCT International Search Report and Written Opinion in connection with International Application No. PCT/US2017/064889, dated May 18, 2018 (22 pages).

* cited by examiner

*Primary Examiner* — Tan Doan

(74) *Attorney, Agent, or Firm* — Haley Guiliano LLP

(57) ABSTRACT

Systems and methods are described for a media guidance application (e.g., implemented on a user device) that dynamically adapts network performance parameters for applications based on their respective usage likelihoods.

20 Claims, 11 Drawing Sheets

SYSTEMS AND METHODS FOR BANDWIDTH CONSUMPTION MANAGEMENT

CROSS-REFERENCE TO RELATED APPLICATIONS

This application is a continuation of U.S. patent application Ser. No. 16/768,236, filed May 29, 2020, which is a national stage application under 35 U.S.C. § 371 of International Application PCT/US2017/064889, filed Dec. 6, 2017, which is hereby incorporated by reference herein in its entirety.

BACKGROUND

Running multiple applications on a network channel with limited throughput affects the individual performance of the applications. Running multiple applications simultaneously in an environment with limited bandwidth causes them to compete for the bandwidth, which impedes the performance of the applications. In certain cases, the demand of an application may experience a sudden increase, which would require more bandwidth. Users may be inconvenienced by the increase in bandwidth requirement and a subsequent degradation in performance of the application when multiple applications may be running simultaneously. Conventional systems do not gauge performance of the network for its impact on applications relying on data being sent through a low bandwidth pipe. This forces users to decide how to allocate bandwidth resources, which is inefficient and negatively impacts the user's media consumption enjoyment.

SUMMARY

Systems and methods are described herein for managing bandwidth consumption of various applications in response to an external trigger. For example, suppose that the user is tagged in a video posted on social media. The media guidance application may detect this event and in response, execute steps such as determining: a media asset associated with the event, an application through which the media asset can be accessed, and the amount of bandwidth needed to ensure access. In this case, the media guidance application may determine that the media asset is the video in which the user is tagged. Furthermore, the media guidance application may determine that the media asset can be accessed using social media applications such as Facebook and Instagram. The media guidance application may retrieve the bandwidth limits of various applications on the user's local device. The bandwidth limit may be the maximum bandwidth an application is allocated for use. For example, the media guidance application may measure that Facebook and Instagram are each consuming 5 megabits per second (Mbps) of a total bandwidth of 10 Mbps in the network. The media guidance application may further determine that the video, in which the user is tagged, requires a bandwidth of 6 Mbps for playback. The media guidance application may calculate, based on the user's usage statistics of the respective applications, the likelihood that the user will access the video on Facebook and the likelihood that the user will access the video on Instagram. For example, the media guidance application may determine that the user accesses Facebook on a daily basis and uses Instagram only once a month. In response, the media guidance application may determine that Facebook has a higher likelihood of being accessed than Instagram. The media guidance application may then determine that Facebook needs an additional 1 Mbps of bandwidth to stream the video and may add 1 Mbps to Facebook's bandwidth limit by reducing Instagram's bandwidth limit by 1 Mbps.

The media guidance application may be implemented on a server and/or at a user device (e.g., a set-top box), and may retrieve a first bandwidth limit of a first application and a second bandwidth limit of a second application. These bandwidth limits may have been set by the media guidance application based on measurements of bandwidth usage. For example, the first bandwidth limit may be associated with a first application, Facebook, and may allow Facebook to consume up to 5 megabits per second (Mbps). The second bandwidth limit may be associated with a second application, Twitter, and may allow Twitter to utilize up to 3 Mbps. These limits may be determined by the media guidance application based on the total bandwidth in the network and the types of media typically accessed on the respective applications. For example, the media guidance application may determine that primarily videos are accessed on Facebook and the videos require at least 5 Mbps. It is also possible that Facebook never utilizes more than 5 Mbps. Therefore, the media guidance application may set Facebook's bandwidth limit to 5 Mbps. The media guidance application may also determine that the total bandwidth in a network is 4 Mbps. Therefore, the bandwidth limit of Facebook must be set to 4 Mbps or less.

The media guidance application may then detect an event of interest for a user. The event of interest may be detected based on preferences specified by the user in a user profile. For example, the media guidance application may detect that a social media post has been made and that the user profile indicates that the user wishes to be notified of social media posts.

Upon detecting the event, the media guidance application may determine that the post includes a photograph that may be viewed using a plurality of social media applications like Twitter, Facebook, Instagram, and others. Based on a user profile, the media guidance application may determine a first likelihood that the media asset (e.g., photograph) will be accessed using a first application and a second likelihood that the media asset will be accessed using the second application. For example, the media guidance application may determine that the user uses the first application (e.g., Facebook) more than the second application (e.g., Twitter or Instagram) for social media posts. Upon determining that the first likelihood is greater than the second likelihood, the media guidance application may reduce the second bandwidth limit by a first amount to increase the first bandwidth limit by the first amount. For example, the media guidance application may determine that the user prefers to use Facebook more than Twitter, and therefore may reduce the bandwidth limit of Twitter, and increase the bandwidth limit of Facebook, since Facebook needs more bandwidth to function.

The described method of managing bandwidth of various applications is more efficient than conventional systems of managing bandwidth, because the described method considers user preferences and predicts a future increase in the bandwidth consumption of a first application based on an external trigger and preferences associated with that trigger. Rather than preventing the user from accessing a desired application when an event is detected because of lack of bandwidth and resources, the described method automatically reallocates bandwidth to enable access when such an event is detected. Additionally, the described method also recommends applications from which bandwidth may be borrowed, to make up for the additional bandwidth that may be needed by the first application.

The media guidance application is also useful for events that can affect long-term usage of applications, for example, a weather alert of a hurricane. Several media assets can be associated with the weather alert, including graphics, text updates, videos, and audio. Suppose that the media asset is a video of a weather forecast. The video may provide details about the hurricane's trajectory and rainfall estimates for various regions. The media guidance application may determine that the likelihood that the media asset will be accessed by Yahoo Weather, a weather application, is greater than Facebook. In response, the media guidance application may increase the bandwidth limit of Yahoo Weather by decreasing the bandwidth limit of Facebook. Thus, the media guidance application is able to anticipate more usage of Yahoo Weather due to the hurricane, and responds accordingly.

In some aspects, the media guidance application sets, at a server, a first bandwidth limit for a first application and a second bandwidth limit for a second application, based on measuring bandwidth consumption for the first and second applications. respectively. For example, the media guidance application may determine a bandwidth limit of an application by executing instances of the application and measuring consumption of the bandwidth of the running instances. In some embodiments, the first bandwidth limit is determined by measuring bandwidth consumption of each of a plurality of instances of the first application running over a plurality of devices. For example, the bandwidth consumption of an application may be measured by determining the bandwidth consumption of multiple instances of an application running on multiple set-top boxes associated with multiple users. These measurements may be used to generate a best-fit regression curve that provides the bandwidth limits for each application.

The media guidance application may detect an occurrence of an event at the server. The detection of an event may be based on user-defined preferences. For example, the user may customize the media guidance application so as to be notified of certain kinds of events. In some embodiments, the occurrence of the event may be communicated to the media guidance application. For example, the server may detect a post on a social media network. The post may be of interest to the user because the post may originate from a second individual related to the user.

The media guidance application may retrieve, at the server, a user profile for a user, wherein the user profile comprises a list of events the user wishes to be notified about. For example, the user may customize the alerts that the user wishes to be notified about. In some embodiments, the user may wish to be notified about social media posts. In some embodiments, the user may wish to be notified about weather changes at a location. Additionally, the user may define a geographical region, that would limit the notification of the events to those occurring in the geographical area.

The media guidance application, at the server, may detect whether the event matches the list of events. For example, the media guidance application may extract metadata associated with the event. The metadata associated with the event may contain location information, time stamps, event type, event description, etc. The extracted metadata is compared to the preferences defined by the user. For example, the list of events may indicate that the user wants to be informed of weather forecasts. Meanwhile, the event detected at the server may be a weekly weather forecast update. The metadata of the event may indicate that the event is associated with weather, New York City, weekly forecast, etc. Therefore, the media guidance application may determine that the event matches the list of events highlighted by the user.

In some embodiments, the media guidance application may determine whether the event occurs in a geographically proximate region around the user, wherein the geographically proximate region is defined by the user. Suppose that the user lives in New York City. The user may therefore be concerned only with weather forecasts related to New York City. In this case, the media guidance application may determine whether the metadata of the weather forecast includes a reference to New York City (e.g., in the title, description, etc.). Upon determining that a detected event is associated with weather updates in New York City, the media guidance application may determine that the event matches the user's list of events because it occurs in a geographically proximate region.

In some embodiments, the media guidance application may determine whether the event is associated with a communication that the user has transmitted to a remote server, wherein the remote server transmits the communication to a plurality of other users associated with the first user on the remote server. For example, the media guidance application may determine whether the user has posted a comment on Facebook that tags multiple other users that are friends with the user. The comment may be transmitted to a remote server, which may forward the comment to all of the users tagged on the post.

Upon determining that the event matches the list of events, the media guidance application may identify, by the server, a media asset associated with the event. For example, the media guidance application may determine that a friend posted a video on Facebook and tagged the user in it. In the list of events, the user may indicate that he/she wishes to be notified about his/her tagged videos on social media applications (e.g., Facebook, Twitter, Instagram, etc.). The media guidance application may identify the media asset to be the video tagged by the user's friend.

The media guidance application may retrieve, from a user profile, a plurality of applications used by the user. For example, the user profile may track the user's application usage history. The application usage history may indicate the application's name, a date when the user accessed the application, times when the user opened or closed the application, and the bandwidth conditions during the times the user accessed the application. For example, the media guidance application may determine, from the user profile, that the user has used several applications (e.g., YouTube, Facebook, ESPN, etc.) in the span of thirty minutes.

The media guidance application may determine, from the plurality of applications, usage statistics of the first application and the second application. For example, suppose that the first application is Facebook and the second application is Instagram. The user's application usage history, found in the user profile, may indicate that Facebook was opened ten times within 24 hours. For each of the ten times the application was accessed, the application usage history may indicate the time stamp for when Facebook was opened, the event(s) the user was a part of (e.g., user viewed a photo), the effect of the event(s) on bandwidth conditions (e.g., how much bandwidth was consumed or freed), and the time stamp for when Facebook was closed. The media guidance application may determine these usage statistics for any given period of time (e.g., day, week, month, year, weekends only, weekdays only, evenings, mornings, etc.). The same process can be used to retrieve usage statistics of the second application (e.g., Instagram).

Based on the usage statistics of the first application and the second application, the media guidance application may determine a first likelihood and a second likelihood, wherein the first likelihood is an indication that the media asset will be accessed using the first application and the second likelihood is an indication that the media asset will be accessed using the second application. For example, Instagram has a feature that allows a user to post a media asset to both Facebook and Instagram. The user therefore has the option to view the media asset on either social media application. The media guidance application may utilize usage statistics to determine the likelihood of the user accessing the media asset through Facebook and the likelihood of the user accessing the media asset through Instagram. The likelihood may be computed using a probabilistic model that is a function of values including, but not limited to, the amount of times the user accessed an application, the duration of access, the priority of a media asset, metadata of the media asset and event, etc.

The usage statistics may include information about the events the user was a part of in each application. For example, the usage statistics may indicate that the user accessed Facebook ten times within 24 hours. During each access, the user may have viewed several videos. In contrast, the user may have only opened Instagram once in 24 hours. Perhaps while accessing Instagram, the user may have only viewed his/her user profile without viewing videos or photos. Likelihood may also depend on whether the user is already accessing one of the applications. For example, if the user has Facebook open when the event occurs, the media guidance application may determine that the user is more likely to access the media asset associated with the event on Facebook. The media guidance application may then utilize an algorithm to quantify the likelihood of using an application to access the media asset. Based on the usage statistics, the media guidance application may determine the chances of the user accessing the media asset (e.g., a tagged video) through one of these applications. For example, the media guidance application may determine that the likelihood of the user viewing the video in which he/she is tagged is 75% through Facebook and 10% through Instagram.

Upon determining that the first likelihood is greater than the second likelihood, the media guidance application may reduce the second bandwidth limit by a first amount to increase the first bandwidth limit by the first amount. For example, the media guidance application may determine that the likelihood of viewing the tagged video on Facebook is 75%, which is higher than the 10% likelihood of viewing on Instagram. Suppose that the first and second bandwidth limits (e.g., bandwidth limits for Facebook and Instagram, respectively) are 10 Mbps each. The first amount may be 8 Mbps, since a bandwidth of 18 Mbps is needed to access the tagged video. The media guidance application may therefore reduce the bandwidth limit of Instagram by 8 Mbps and increase the bandwidth limit of Facebook by 8 Mbps. As a result, the first and second bandwidth limits may be 18 Mbps and 2 Mbps, respectively. Once the user has completed viewing the tagged video, the media guidance application may return both bandwidth limits to their original values. In some embodiments, the second bandwidth limit (e.g., Instagram's bandwidth limit) may not be reduced because the network may have additional available bandwidth that is not being used by any other application(s). For example, if the overall bandwidth limit is 100 Mbps and Twitter and Facebook are collectively consuming 20 Mbps, 80 Mbps is still available for use. The media guidance application may therefore increase the first bandwidth limit to 18 Mbps, upon allocating 8 Mbps from the 80 Mbps. Instagram's bandwidth limit may therefore remain at 10 Mbps.

In some embodiments, the media guidance application may determine that the second bandwidth limit cannot be reduced as the second application is accessing a second media asset consuming bandwidth up to the second bandwidth limit. For example, the media guidance application may detect that the user is already accessing a second media asset, such as a live stream of a concert, on Instagram. If the second bandwidth limit is 10 Mbps and the bandwidth being accessed by the live stream is also 10 Mbps, the media guidance application may determine that the second bandwidth limit cannot be reduced. Upon determining that the second bandwidth limit cannot be reduced, the media guidance application may determine a first quality associated with a first bit consumption rate of the second media asset. For example, the viewer may be viewing the live stream in high-definition (e.g., 720p), which requires a first bit consumption rate of at least 10 Mbps. In response, the media guidance application may reduce the quality of the second media asset from the first quality to a lower second quality, the second quality being associated with a second bit consumption rate lower than the first bit consumption rate. For example, the media guidance application may reduce the quality of the live stream to standard definition (e.g., 480p). The second bit consumption rate associated with the second quality may be at least 5 Mbps. Therefore, the media guidance application is able to free 5 Mbps from the bandwidth being consumed by the second application.

In some embodiments, the media guidance application may determine that the second bandwidth limit cannot be reduced, as the second application is accessing a second media asset consuming bandwidth up to the second bandwidth limit and has a higher priority. For example, the media guidance application may determine that the user is currently viewing a media asset associated with a hurricane alert on Yahoo Weather. The media asset may be a video with evacuation instructions. The media guidance application may refer to a priority list in the user's profile that indicates that safety alerts are given a higher priority than social media posts. Therefore, the bandwidth limit for Yahoo Weather may not be reduced in favor of the social media post.

In some embodiments, the media guidance application may present the user with an option to manually reduce the second bandwidth limit to satisfy the increase in bandwidth consumption of the first application. For example, the media guidance application may inform the user that the second application, Instagram, is using 10 Mbps of bandwidth, which can be reduced to access the media asset on Facebook. In response to receiving an input from the user, the media guidance application may reduce the second bandwidth limit of the second application based on the received input. For example, the user may confirm that he/she wishes to reduce the second bandwidth limit of Instagram. The media guidance application may then execute the reduction based on the user's confirmation.

In some embodiments, the media guidance application may recommend applications from which bandwidth may be borrowed, to make up for the additional bandwidth that may be needed by the first application. For example, the first application may need 5 Mbps of additional bandwidth. The media guidance application may identify the applications that are running on the user's device and may determine the amount of bandwidth being utilized by each application. In a scenario in which two applications, Twitter and Instagram, have respective bandwidth limits, 5 Mbps and 4 Mbps, the media guidance application may determine that the applications are only accessing photos and are thus each utilizing 1 Mbps of the total bandwidth. Accordingly, the media guidance application may determine that the bandwidth limits of Twitter and Instagram can be reduced. The media guidance application may recommend reducing the bandwidth limit of Twitter and Instagram to the user, or may automatically reduce the bandwidth limits.

In some embodiments, the media guidance application may stop the second application from accessing content to free up the first amount of bandwidth (e.g., the amount needed to access the media asset on the first application). Furthermore, the media guidance application may record a position of the content where the access to content was stopped. For example, the second application, Instagram, may be displaying a live stream of a concert. In the event that a notification of a tagged video on Facebook is presented, and the user chooses to view the tagged video, the media guidance application may record where the user left off at the live stream and prevent Instagram from consuming bandwidth to display the live stream. In some embodiments, the second application resumes accessing content at a position substantially similar to the recorded position. For example, once the user has finished viewing the tagged video on Facebook, the media guidance application may resume the live stream on Instagram at the position where the user left off.

In some embodiments, the second application is automatically allowed to access content when the first amount of bandwidth is available again. For example, Instagram may be able to display the live stream once the bandwidth consumed by Facebook to display the tagged video (e.g., 8 Mbps) is freed. It should be noted that the first amount of bandwidth can be freed from any other application as well; this is not limited to the first application. For example, a third application such as Twitter may stop using 8 Mbps of the bandwidth, and Instagram may access the live stream using this first amount.

In some embodiments, the media guidance application may retrieve, from the user profile, a first plurality of media assets accessed by the user using the first application. For example, the user profile may store a list of media assets that the user accesses on the first application, Facebook. These media assets may include a video of a baseball game, a live stream of a baseball game, a video of a baseball player, etc. The media guidance application may determine a first set of characteristics common to the first plurality of media assets. For example, the media guidance application may determine that the majority of the user's list is made up of videos of sports, specifically baseball. The media guidance application may retrieve, from the user profile, a second plurality of media assets accessed by the user using the second application. For example, the media guidance application may determine that the user accesses photos of landmarks and skylines on Instagram. The media guidance application may determine a second set of characteristics common to the second plurality of media assets. For example, the media guidance application may determine that the user's list is made up of photos of objects. The media guidance application may determine a type of the media asset. Returning to an example given previously, the media asset may be a live stream of a concert. The media guidance application may identify the media asset to be a live video. The media guidance application may compare the type to the first set of characteristics and the second set of characteristics. For example, the media guidance application may compare the live video type to the sports video type and object photos type. Based on the comparison, the media guidance application may determine a first likelihood and a second likelihood. For example, the media guidance application may determine that live videos correspond to sports videos more than object photos. Since the user mostly accesses videos on Facebook, the media guidance application may assign a higher first likelihood (e.g., 80%) than the second likelihood (e.g., 20%).

In some embodiments, the media guidance application may communicate the reduction in the second bandwidth limit, wherein the communication (e.g., a network control message) is sent over a first network different from a second network over which the media asset is transmitted. For example, sending the instruction itself may consume bandwidth. Suppose that the media guidance application determines that the second bandwidth limit needs to be reduced. Rather than communicating this change to the user's local device over Wi-fi, the media guidance application may communicate the reduction over a cellular network. This may be crucial in situations where all available bandwidth is being consumed and another network is needed to send instructions of the reduction. In some embodiments, the media guidance application may pre-allocate bandwidth for sending control messages.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
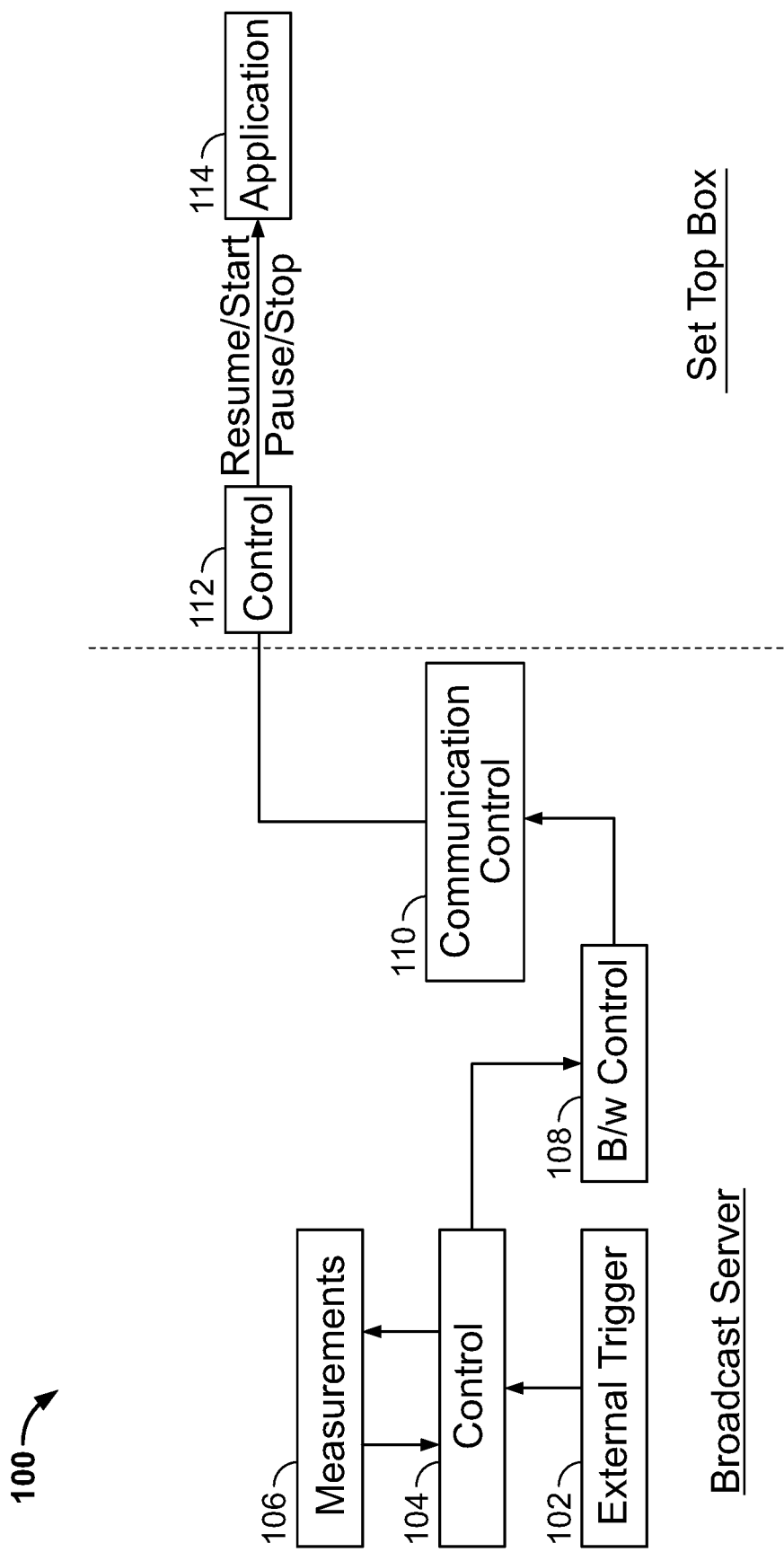
FIG. 1 is a block diagram of a system that dynamically adapts network performance parameters for applications, in accordance with some embodiments of the disclosure.

Systems and methods are described to address managing bandwidth consumption of various applications in response to an external trigger. An external trigger is a component in the media guidance application that detects an event and initiates a series of processes to efficiently present media to a user. The media guidance application may be implemented on a server and/or at a user device (e.g., a set-top box). Consider an example in which a user is tagged in an MP4 format video posted on social media. The media guidance application, on the server, may detect this event and execute steps such as identifying: a media asset associated with the event, an application through which the media asset can be accessed, and the amount of bandwidth needed to ensure access. The media asset can be, but is not limited to, a video, a photo, a stream, a song, etc. In this case, the media guidance application may determine that the media asset is the video in which the user is tagged.

Furthermore, the media guidance application may determine that the media asset can be accessed using social media applications such as Facebook and Instagram. The media guidance application may refer to the metadata of an application to determine the media assets that the application can successfully open. For example, the metadata of YouTube may indicate compatible media asset types such as MP4 and MPEG videos. On the other hand, SoundCloud, a music streaming application, may be compatible only with MP3 format audio. In this case, the respective metadata of Facebook and Instagram may indicate compatibility with MP4 and MPEG videos.

The media guidance application may retrieve the bandwidth limits of various applications on the user's local device. The bandwidth limit may be the maximum bandwidth an application is allocated for utilization. For example, the media guidance application may measure that Facebook and Instagram are each consuming 5 megabits per second (Mbps) of a total bandwidth of 10 Mbps in the network. The media guidance application may further determine that the video, in which the user is tagged, requires a bandwidth of 6 Mbps for playback. The media guidance application may calculate, based on the user's usage statistics of the respective applications, the likelihood that the user will access the video on Facebook and the likelihood that the user will access the video on Instagram. The likelihood may be a value such as a probability, a fraction, a percentage, or a qualitative assessment (e.g., unlikely, likely, highly likely, etc.). It may be derived based on how frequently an application is used, the duration of access, network conditions, and user preferences. For example, the media guidance application may determine that the user accesses Facebook on a daily basis and uses Instagram only once a month. In response, the media guidance application may determine that Facebook has a higher likelihood (e.g., 70%) of being accessed than Instagram (e.g., 20%). The media guidance application may then determine that Facebook needs an additional 1 Mbps of bandwidth to stream the video and may add 1 Mbps to Facebook's bandwidth limit by reducing Instagram's bandwidth limit by 1 Mbps.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as on-line applications (i.e., provided on a web-site), or as stand-alone applications or clients on hand-held computers, personal digital assistants (PDAs) or cellular telephones. In some systems, users may control equipment remotely via a media guidance application. For example, users may access an online media guide and set recordings or other settings on their in home equipment. This may be accomplished by the on-line guide controlling the user's equipment directly or via another media guide that runs on the user's equipment. Remote access of interactive media guidance applications is discussed in greater detail in U.S. patent application Ser. No. 11/246,392, filed Oct. 7, 2005, which is hereby incorporated by reference herein in its entirety.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 1 is a block diagram of a system that dynamically adapts network performance parameters for applications, in accordance with some embodiments of the disclosure. FIG. 1 is split into two sections, broadcast server and set-top box. It should be noted that the two sections are not limited to being a broadcast server and set-top box. For example, any server that can communicate with any device used to access a media asset by the user (e.g., wireless communication device, computer equipment, etc.) is also applicable to FIG. 1. Furthermore, multiple servers can be used in combination rather than one server. The server can be any device that provides a service, such as file retrieval for a client, such as the user's local device. The server can be connected to the user's local area network (LAN) as a remote access server (RAS), or may be a part of the local area network itself (e.g., a LAN server). For example, the server can be a computer in a LAN network, a database server that processes database queries, a cloud server that provides services on demand over the Internet, a dedicated file server that stores files, or any device that can provide services to a client device remotely.

External trigger 102 may be dedicated hardware composed of control circuitry 804 (discussed in FIG. 8), or a process executed by control 104. External trigger 102 may monitor incoming network packets from the Internet that refer to the user's local device as the destination IP address. External trigger 102 may parse these data packets by extracting the data in the payload of the network packet. For example, the payload of the network packet may indicate that the network packet is a message associated with Facebook. Based on the extract data, external trigger 102 may determine events associated with the user. These events do not necessarily need to be a part of the user's list of events, which includes events that the user is particularly interested in. For example, the external trigger 102 may detect events such as a social media post, a weather update, a sports update, a video message, etc. Suppose that the external trigger 102 detects that a video in which the user is tagged has been posted on Facebook and Instagram. Simultaneous posting of the same photo is possible because Instagram and Facebook allow photos/videos to be uploaded to both platforms with the same tags, descriptions, and time stamps.

The external trigger 102 sends event information, such as event type, description, time stamp, associated application name, etc. to the server control 104. Control 104 may be the central processer of the server and may be implemented by control circuitry 804 (discussed in FIG. 8). Control 104 accepts information from the external trigger 102 and filters events that are relevant to the user. To determine relevance, control 104 accesses the user's profile from storage 808 (described in FIG. 8) to retrieve a list of events selected by the user. The list of events includes information about events that the user is interested in, or has given priority to. For example, the user may be interested in social media posts in which he/she is tagged. Control 104 determines whether the events sent by the external trigger 102 correspond to the events in the list. More specifically, control 104 extracts metadata associated with an event such as event type, keywords, associated applications and descriptions from the payloads of each data packet associated with the event. Control 104 also extracts metadata associated with the each of the events in the user's list of events from storage 808. Control 104 compares the metadata of the detected event with each metadata of the events in the list of events in order to determine a match. For example, the metadata may indicate applications associated with the event. Suppose that one of the events in the user's list of events has metadata that indicates an application association with Facebook and Instagram. Suppose that the metadata also lists the event type as a social media tag, and the description as an MP4 video. If the event detected by external trigger 102 has metadata including these same properties, control 104 may determine that the detected event matches the event in the list of events. In this case, control 104 may also determine from these properties, that the media asset is a social media MP4 video in which the user is tagged.

Upon determining that at least one of the events sent by the external trigger 102 corresponds to the list of events, control 104 sends event information to measurements 106. Measurements 106 is a block that may be dedicated hardware implemented by control circuitry 804 (discussed in FIG. 8), or a process of control 104. Measurements 106 monitors applications to determine each respective bandwidth limit. For example, control 104 may send information about an event involving a tagged photo posted on Facebook and Instagram to measurements 106. Measurements 106 may retrieve the bandwidth limits from a bandwidth consumption database. It may further update the bandwidth consumption database based on application usage statistics. Specifically, it may monitor the bandwidth utilized by all applications during various events. For example, when displaying a high-definition video, measurements 106 may determine that Facebook utilizes a bandwidth of 6 Mbps. Measurements 106 may run multiple tests to determine the amount of bandwidth needed to perform various tasks for events. In some embodiments, the tests may involve measuring bandwidth limits of each of a plurality of instances of the first application running over a plurality of devices. Measurements 106 may determine the current bandwidth conditions, and a bandwidth limit for each application associated with the event sent by control 104. For example, measurements 106 may determine that the bandwidth limit for Facebook is 4 Mbps and the bandwidth limit for Instagram is 3 Mbps, and may determine the usage statistics for each application. The usage statistics may include information about the events the user was a part of in each application. For example, the usage statistics may indicate that the user accessed Facebook forty times within seven days. During each access, the user may have viewed several videos. In contrast, the user may have only opened Instagram three times in seven days. Perhaps while accessing Instagram, the user may have only viewed his/her user profile without viewing videos or photos. Measurements 106 may retrieve this usage data from storage 808 (discussed in FIG. 8) and send the information to control 104.

In response to receiving information about application usage statistics and the bandwidth limits for the applications associated with the media asset, control 104 may determine a first likelihood and a second likelihood. The first likelihood is an indication that the media asset will be accessed using the first application and the second likelihood is an indication that the media asset will be accessed using the second application. In this example, the media asset is the tagged video, the first application is Facebook, and the second application is Instagram. Control 104 may utilize usage statistics to determine the likelihood of the user accessing the media asset through Facebook and the likelihood of the user accessing the media asset through Instagram. Control 104 may compute the likelihood using a probabilistic model that is a function of values including, but not limited to, the amount of times the user accessed an application, the duration of access, the priority of a media asset, metadata of the media asset and event, etc. Likelihood may also depend on whether the user is already accessing one of the applications. For example, if the user has Facebook open when the event occurs, control 104 may detect that the user is accessing Facebook and may determine that the user is more likely to access the media asset associated with the event on Facebook. Control 104 may then utilize an algorithm to quantify the likelihood of using an application to access the media asset.

Based on the usage statistics and current application usage information, control 104 may determine the chances of the user accessing the media asset (e.g., tagged video) through one of these applications. For example, control 104 may determine that the likelihood of the user viewing the video in which he/she is tagged via Facebook is 75% and 10% via Instagram.

Control 104 then sends likelihood values to B/W (bandwidth) Control 108. B/W Control 108 may be dedicated hardware implemented with control circuitry 804 (discussed in FIG. 8), or it may be a process of control 104. B/W Control 108 analyzes, assigns, and frees bandwidth from the user's household network. For example, B/W Control 108 may determine that the total bandwidth in the household or accessible to the user (e.g., 20 Mbps) is being divided across five applications: Facebook, Instagram, Twitter, Netflix, and Yahoo Weather. Based on the likelihood values determined by control 104, B/W Control 108 may determine that the bandwidth consumption values need to be adjusted. For example, Facebook's first bandwidth limit may be 4 Mbps. Instagram's second bandwidth limit may be 3 Mbps. The likelihood values may indicate that the user is more likely going to access the tagged video, which requires a bandwidth of 6 Mbps to view, on Facebook. B/W Control 108 may determine that the first bandwidth limit needs to be increased by 2 Mbps (e.g., the first amount), in order to access the media asset. Since there is no available bandwidth in the network, B/W Control 108 may decrease the second bandwidth limit by 2 Mbps and add it to the first bandwidth limit. This would allow the user to view the tagged video on Facebook.

B/W Control 108 then communicates these changes to a communication control 110. Communication control 110 may be dedicated hardware implemented by control circuitry 804 (discussed in FIG. 8) or a process of control 104. Communication control 110 serves as a communication bridge between the broadcast server and the set-top box in this example. In some embodiments, the communication control 110 may pre-allocate a small amount of bandwidth to carry control messages. In some embodiments, the communication control 110 may use an alternate communication medium to transfer messages between the server and set-top box. For example, if the first network is based on Wi-Fi (e.g., for media delivery), communication control 110 may use cellular data for communication.

The set-top box's control 112 receives control messages from the broadcast server's communication control 110. Control 112 may be the central processer of the set-top box and may be implemented using control circuitry 804 (discussed in FIG. 8). The control messages may indicate that appropriate changes have been made to bandwidth limits to allow the user to access the media application in the first application. Control 112 may then allow the user to resume/start/pause/stop the media asset when accessing on application 114.

In some embodiments, the media guidance application may not automatically adjust the bandwidth at B/W Control 108. For example, Control 104 may determine that the first and second likelihoods are the same. Control 104 may also generate a threshold likelihood. The threshold likelihood may be the minimum difference required between two likelihoods, in order for B/W Control 108 to automatically adjust bandwidth limits. For example, the threshold likelihood may be 10%. If the first likelihood is 60% and the second likelihood is 55%, the difference between the two likelihoods is only 5%. Control 104 may determine that this difference is not higher than the threshold likelihood and may request that the user decide which application he/she wants to use to access the media asset.

In some embodiments, the user may select an option on the media guidance application which requires the media guidance application to prompt the user of new events and allow the user to manually select the applications he/she wishes to use. Suppose that the user is accessing the application Twitter. Event trigger 102 may detect a new social media post (e.g., a photo post) that can be accessed on Facebook and Instagram. Information about the social media post may be sent to control 104 (FIG. 1) by external trigger 102. Control 104 may then compare the event to the user's list of events. If the user indicates in his/her list of events that the he/she wishes to be informed about new social media posts, control 104 may determine that the event corresponds to the user's list of events. For example, the list of events may contain an event type "social media post," which matches the new event. Control 104 may also identify the media asset and the applications that can present the media asset based on the event's metadata. Control 104 then communicates with measurement 106 (FIG. 1) to retrieve usage statistics and bandwidth limits. This information is used by control 104 to generate usage likelihoods for each application that can present the media asset to the user. Control 104 then communicates directly with communication control 110 (FIG. 1) to inform the user of the new event. Control 112 (FIG. 1) accepts the control message from communication control 110 and generates an overlay 204 (FIG. 2) on application 114 (FIG. 1).

It is contemplated that the blocks or descriptions of FIG. 1 may be used with any other embodiment of this disclosure. In addition, the blocks and descriptions described in relation to FIG. 1 may be done in alternative orders or in parallel to further the purposes of this disclosure. For example, each of these blocks may be performed in any order, in combination with each other, in parallel, or substantially simultaneously to reduce lag or increase the speed of the system or method. The blocks may be implemented in whole or in part by the server and/or the user's local device (e.g., set-top box). Any of these steps may also be skipped or omitted from the process. Furthermore, it should be noted that any of the devices or equipment discussed in relation to FIGS. 8-9 could be used to perform one or more of the blocks in FIG. 1.

Figure 2:
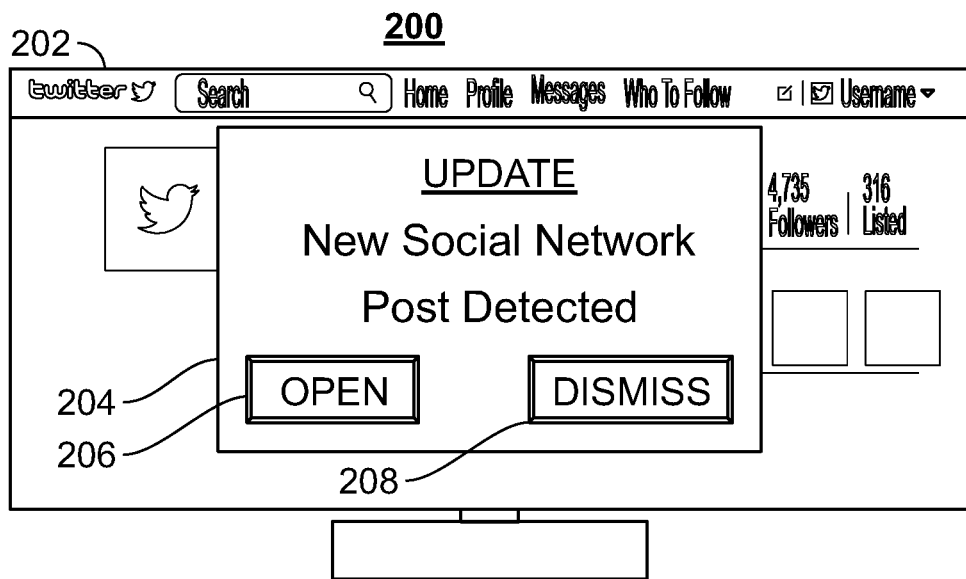
FIG. 2 is an illustrative example of a display screen that informs the user of an event that matches the user's list of events, in accordance with some embodiments of the disclosure.

FIG. 2 is an illustrative example of a display screen 200 that informs the user of an event that matches the user's list of events. Control 112 (FIG. 1) may generate display 202, which represents an application that the user is using. Overlay 204 is an alert that informs the user of the event's occurrence and provides options for the user. Button 206 "Open" initiates the process in control 112 to allow the user to access the media asset. Button 208 "Dismiss" closes overlay 204 without additional actions.

In this example, control 112 (FIG. 1) generates display 202, which presents the Twitter interface being accessed by the user. B/W Control 108 (FIG. 1) may determine that Twitter is utilizing bandwidth in the Wi-Fi network of the household. Suppose that B/W Control 108 determines that no free bandwidth is available because various applications, including Twitter, are collectively consuming the total bandwidth. Communication control 110 (FIG. 1) may send a control message, using cellular data, to control 112 to generate overlay 204.

Overlay 204 provides the user with information about the new event. Overlay 204 may include the event name and the media asset associated with the event. For example, overlay 204 states "New Social Network Post Detected (Video)." In this case, the event is the new social network post and the media asset is the video. If the user chooses to access the media asset, he/she may select button 206 "Open," and if the user does not choose to access the media asset, he/she may select button 208 "Dismiss." Suppose that the user selects "Open." The user's response may be accepted on the user interface 810 through I/O path 802. Control circuitry 804 (discussed in FIG. 8) may then initiate the process of determining whether the social media post can be accessed given the user's household bandwidth conditions. As mentioned previously, control 104 may determine applications that are listed in the metadata of the event detected by external trigger 102. For example, Facebook and Instagram may be able to access the tagged video associated with the social media post. Control 104 may thus calculate the likelihoods of the user accessing the media asset through each listed application based on usage statistics. Suppose that the usage statistics retrieved by control 104 (FIG. 1) from measurements 106 (FIG. 1) indicate that the user primarily uses Facebook to access all social media posts associated with videos (e.g., perhaps the user does not use Instagram, even though Instagram is installed on the user's device). Control 104 may determine that the likelihood of accessing the video on Facebook is 90% and the likelihood of accessing the video on Instagram is 5%.

Figure 3:
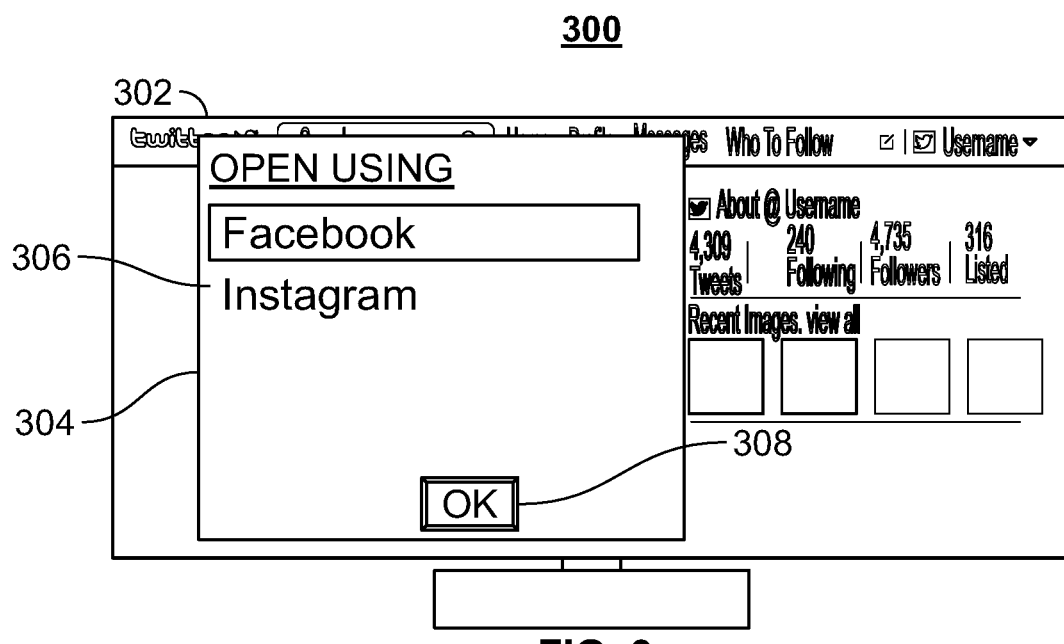
FIG. 3 is an illustrative example of a display screen that requests user selection of an application to access a media asset associated with the event, in accordance with some embodiments of the disclosure.

FIG. 3 is an illustrative example of a display screen 300 that requests user selection of an application to access a media asset associated with the event. Control 112 (FIG. 1) may generate display 302, which depicts the application described in display 202 (e.g., Twitter). The overlay 304 is generated by control 112 in response to the user selecting button 206 "Open" on overlay 204 (FIG. 2). Overlay 304 lists all applications that can be used to access the media asset associated with the event. Application selector 306 highlights the application, selected by the user, as the mode of access to the media asset. The user may move the application selector 306 to highlight the other applications listed in overlay 304. The user may then confirm his/her selection by selecting button 308 "OK" via I/O path 802 on user interface 810 (discussed in FIG. 8).

In some embodiments, the list of applications on overlay 304 are ordered based on likelihoods. Therefore, the media guidance application may list Facebook above Instagram on overlay 304 (FIG. 3) because the likelihood of Facebook, as determined by control 104, is greater than Instagram's likelihood. The media guidance application may receive user input of application selector 306 hovering over Facebook and selecting button 308 to confirm Facebook as the selection.

I/O path 802 (discussed in FIG. 8) may send the user's selection to control 112 via communication control 110 (FIG. 1), which further sends the control message indicating the user's selection to B/W Control 108 (FIG. 1). B/W Control 108 may monitor the total bandwidth in the network and determine the amount of free bandwidth (e.g., bandwidth not being utilized in the network). B/W Control 108 may also determine how to adjust the bandwidth distribution in order to allow the user to access the media asset on the application selected by the user. For example, B/W Control 108 may determine that the total bandwidth in the network is 10 Mbps and that three applications are utilizing bandwidth. Suppose that Facebook is utilizing 2 Mbps, Instagram is utilizing 1 Mbps, and Twitter is utilizing the remaining 7 Mbps. B/W Control 108 may determine from the media asset's metadata that in order to access the social media post on Facebook, at least 4 Mbps is required. B/W Control 108 may determine to reduce the bandwidth limit for Instagram by 0.5 Mbps and the bandwidth limit for Twitter by 1.5 Mbps. Thus, an additional 2 Mbps can potentially be available for Facebook to utilize. B/W Control 108 may then send a control message to communication control 110 about the potential adjustments to the bandwidths. Communication control 110 forwards this message to control 112, which generates an alert for the user described in FIG. 4.

Figure 4:
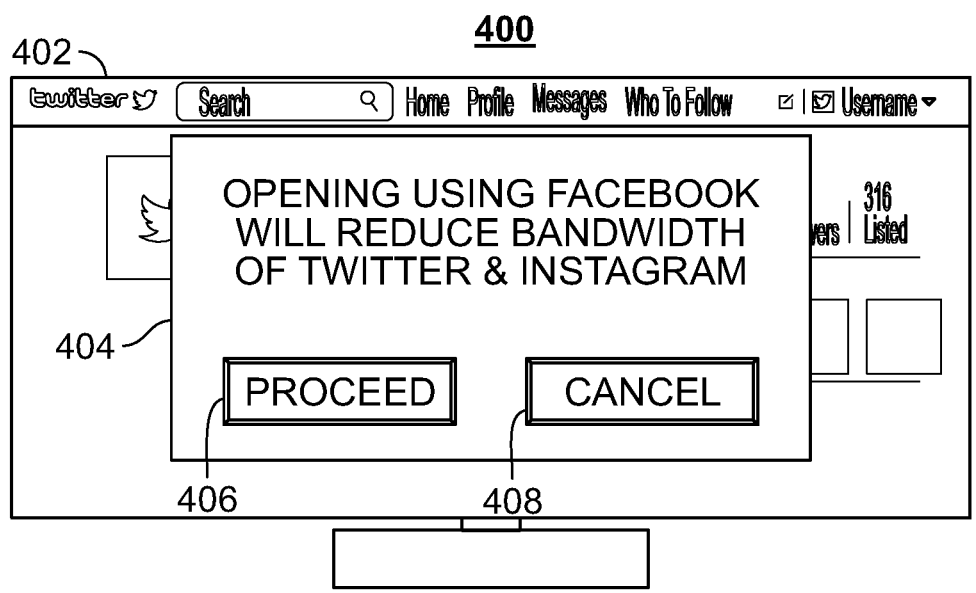
FIG. 4 is an illustrative example of a display screen that informs the user of bandwidth adjustments that may occur in response to selecting an application to access the media asset, in accordance with some embodiments of the disclosure.

FIG. 4 is an illustrative example of the display screen 400 that informs the user of bandwidth adjustments that may occur in response to selecting an application to access the media asset. Display 402, generated by control 112, may continue presenting the application currently accessed by the user (e.g., Twitter). In the example, overlay 404, which is also generated by control 112, informs the user that "opening using Facebook will reduce bandwidth of Twitter and Instagram." This message is generated by control 112 in response to the proposed changes to bandwidth made by B/W Control 108 (FIG. 1). The user may select button 406 "Proceed" to allow B/W Control 108 to execute the proposed changes. The user may also decide against the proposed changes and select button 408 "Cancel." The user's responses are accepted by I/O path 802 on user interface 810 (discussed in FIG. 8).

Suppose that the user chooses to accept the proposed changes and selects button 406. Control 112 (FIG. 1) directs a control message through communication control 110 (FIG. 1) to B/W Control 108 to execute the proposed changes to the bandwidths. For example, B/W Control 108 may reduce the bandwidth limit of Instagram by 0.5 Mbps. B/W Control 108 may also reduce the bandwidth limit of Twitter by 1.5 Mbps. B/W Control 108 may then add the freed bandwidth to the bandwidth limit of Facebook. Thus, the bandwidth limit of Facebook becomes 4 Mbps, which meets the bandwidth requirement for accessing the video in the social media post.

In some embodiments, control 112 may receive the proposed changes to bandwidths made by B/W Control 108 and determine that the application currently being accessed by the user cannot function if the proposed changes are executed. For example, the Twitter application may be accessing a video for display to the user. The video's metadata may indicate requirement of a bandwidth of at least 7 Mbps. If Twitter's bandwidth limit is 7 Mbps, and no free bandwidth is available, control 112 may determine that Twitter's bandwidth limit cannot be reduced. If the proposed changes made by B/W Control 108 involve reducing Twitter's bandwidth limit, control 112 may request the user for a decision on how to handle the proposal, as presented in FIG. 5.

Figure 5:
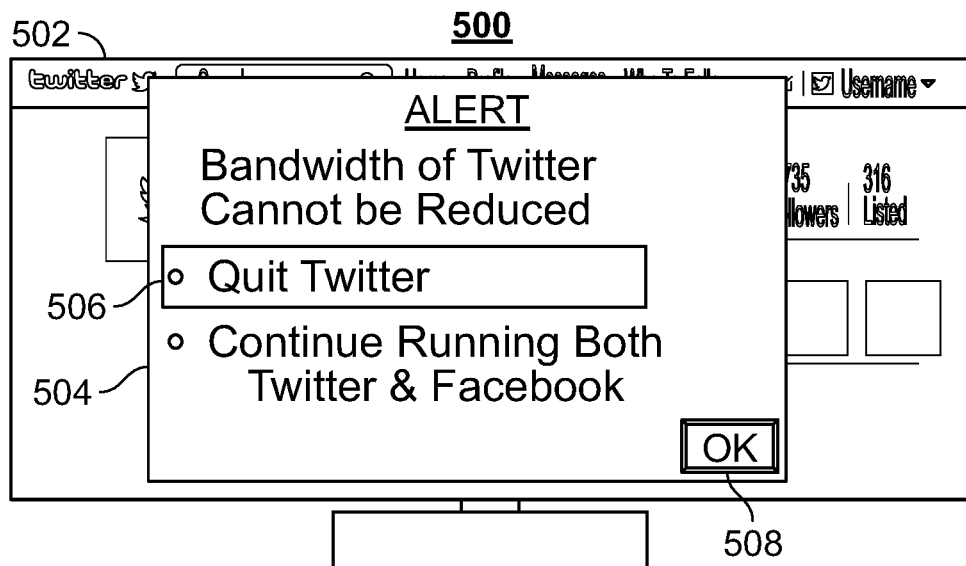
FIG. 5 is an illustrative example of a display screen that alerts the user of bandwidth adjustments that cannot be made, in accordance with some embodiments of the disclosure.

FIG. 5 is an illustrative example of the display screen 500 that alerts the user of bandwidth adjustments that cannot be made. Display 502 may present that application that the user is currently accessing. Overlay 504 presents the alert to the user. For example, overlay 504 may state "bandwidth of Twitter cannot be reduced" and then provide options to the user to respond to the alert. Response selector 506 can be hovered over the different responses to indicate the response the user selects. Button 508 confirms the selection made by the user.

In the example, overlay 504 lists two options to respond to the alert. The first response is quitting Twitter. This option will close the application entirely and free up all bandwidth utilized by Twitter. Upon selecting button 508 "OK," control 112 (FIG. 1) sends B/W Control 108 (FIG. 1) a control message, to release the bandwidth utilized by Twitter, through communications control 110 (FIG. 1). B/W Control 108 may prioritize utilizing free bandwidth to add to the bandwidth limit of the application selected by the user. For example, B/W Control 108 may determine that 7 Mbps of bandwidth is now available. Therefore, Instagram's bandwidth limit does not need to be decreased. Instead, 2 Mbps from the free bandwidth can be added to Facebook's bandwidth limit.

The user may also select the second option "continue running both Twitter & Facebook." Upon determining that a bandwidth limit cannot be reduced, control 112 (FIG. 1) may determine a first quality associated with a first bit consumption rate of the second media asset. In this case, the second media asset is the media asset being accessed on Twitter. For example, the viewer may be viewing a video on Twitter in high-definition (e.g., 720p), which requires a first bit consumption rate of at least 7 Mbps. In response, control 112 may reduce the quality of the second media asset from the first quality (e.g., 720p) to a second quality (e.g., 480p), which is associated with a second bit consumption rate (e.g., that is lower than the first bit consumption rate). For example, the control 112 may reduce the quality of the video to standard definition (e.g., 480p). The second bit consumption rate associated with the second quality may be at least 4 Mbps. Therefore, control 112 is able to free 3 Mbps from the bandwidth being consumed by Twitter. Control 112 can send a control message, indicating the increase in bandwidth and the user's request to run both applications, to B/W Control 108 through communication control 110. In response, B/W Control 108 may allocate 1.5 Mbps of the 3 Mbps that are freed to Facebook's bandwidth limit. It may also maintain Instagram's bandwidth limit at 1 Mbps and instead allocate 2 Mbps of the 3 Mbps to Facebook's bandwidth limit. This allows control 112 to run both Twitter and Facebook simultaneously.

Figure 6:
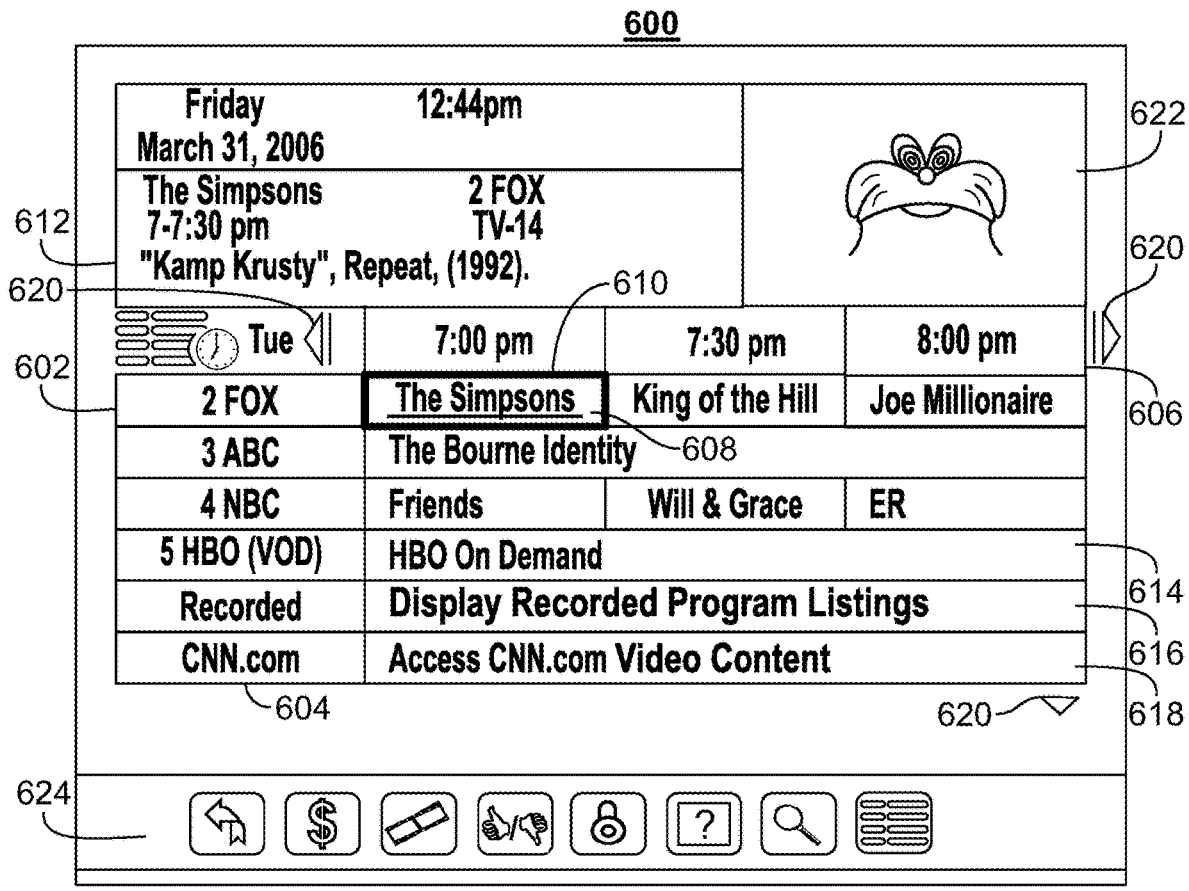
FIGS. 6 and 7 show illustrative examples of display screens generated by a media guidance application, in accordance with some embodiments of the disclosure.
Figure 7:
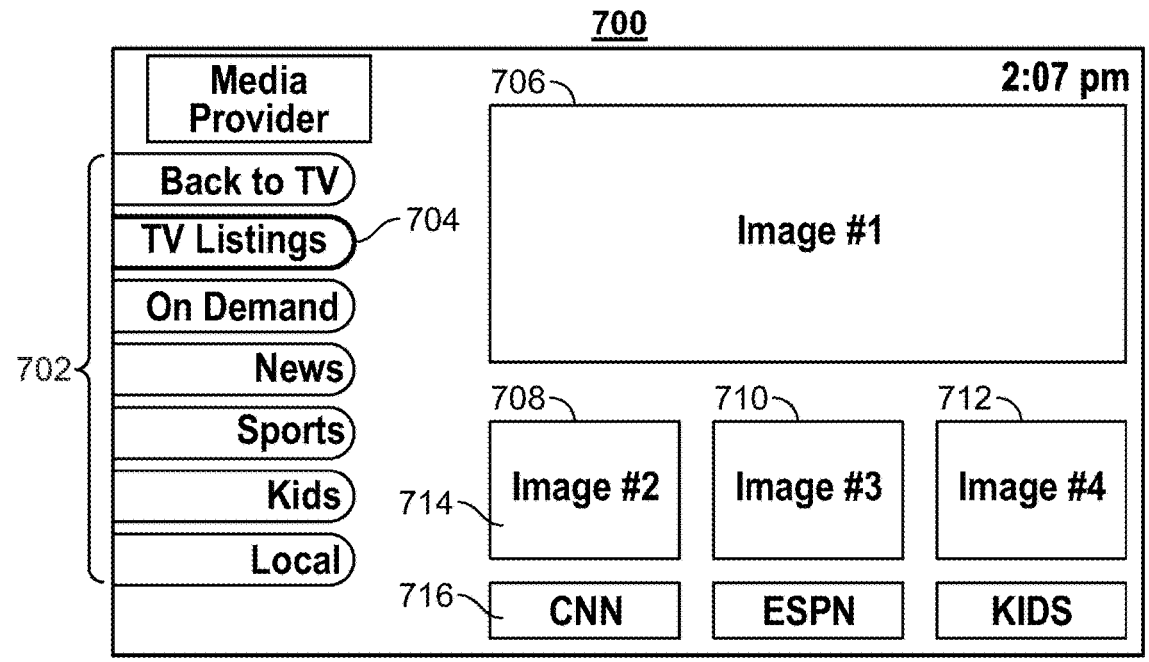

FIGS. 6-7 show illustrative display screens that may be used to provide media guidance data. The display screens shown in FIGS. 6-7 may be implemented on any suitable user equipment device or platform. While the displays of FIGS. 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 6 shows illustrative grid of a program listings display 600 arranged by time and channel that also enables access to different types of content in a single display. Display 600 may include grid 602 with: (1) a column of channel/content type identifiers 604, where each channel/content type identifier (which is a cell in the column) identifies a different channel or content type available; and (2) a row of time identifiers 606, where each time identifier (which is a cell in the row) identifies a time block of programming. Grid 602 also includes cells of program listings, such as program listing 608, where each listing provides the title of the program provided on the listing's associated channel and time. With a user input device, a user can select program listings by moving highlight region 610. Information relating to the program listing selected by highlight region 610 may be provided in program information region 612. Region 612 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 602 may provide media guidance data for non-linear programming including on-demand listing 614, recorded content listing 616, and Internet content listing 618. A display combining media guidance data for content from different types of content sources is sometimes referred to as a "mixed-media" display. Various permutations of the types of media guidance data that may be displayed that are different than display 600 may be based on user selection or guidance application definition (e.g., a display of only recorded and broadcast listings, only on-demand and broadcast listings, etc.). As illustrated, listings 614, 616, and 618 are shown as spanning the entire time block displayed in grid 602 to indicate that selection of these listings may provide access to a display dedicated to on-demand listings, recorded listings, or Internet listings, respectively. In some embodiments, listings for these content types may be included directly in grid 602. Additional media guidance data may be displayed in response to the user selecting one of the navigational icons 620. (Pressing an arrow key on a user input device may affect the display in a similar manner as selecting navigational icons 620.)

Display 600 may also include video region 622, and options region 626. Video region 622 may allow the user to view and/or preview programs that are currently available, will be available, or were available to the user. The content of video region 622 may correspond to, or be independent from, one of the listings displayed in grid 602. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 626 may allow the user to access different types of content, media guidance application displays, and/or media guidance application features. Options region 626 may be part of display 600 (and other display screens described herein), or may be invoked by a user by selecting an on-screen option or pressing a dedicated or assignable button on a user input device. The selectable options within options region 626 may concern features related to program listings in grid 602 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 9. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 7. Video mosaic display 700 includes selectable options 702 for content information organized based on content type, genre, and/or other organization criteria. In display 700, television listings option 704 is selected, thus providing listings 706, 708, 710, and 712 as broadcast program listings. In display 700 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 708 may include more than one portion, including media portion 714 and text portion 716. Media portion 714 and/or text portion 716 may be selectable to view content in full-screen or to view information related to the content displayed in media portion 714 (e.g., to view listings for the channel that the video is displayed on).

The listings in display 700 are of different sizes (i.e., listing 706 is larger than listings 708, 710, and 712), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 8:
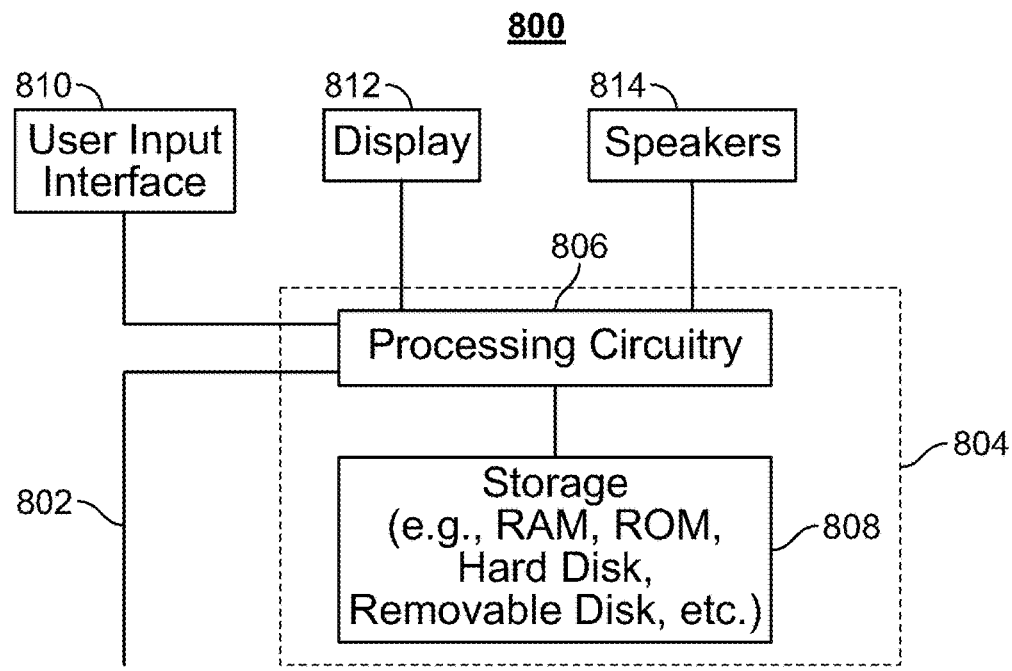
FIG. 8 is a block diagram of an illustrative user equipment device, in accordance with some embodiments of the disclosure.

Users may access content and the media guidance application (and its display screens described above and below) from one or more of their user equipment devices. FIG. 8 shows a generalized embodiment of illustrative user equipment device 800. More specific implementations of user equipment devices are discussed below in connection with FIG. 9. User equipment device 800 may receive content and data via input/output (hereinafter "I/O") path 802. I/O path 802 may provide content (e.g., broadcast programming, on-demand programming, Internet content, content available over a local area network (LAN) or wide area network (WAN), and/or other content) and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media guidance application stored in memory (i.e., storage 808). Specifically, control circuitry 804 may be instructed by the media guidance application to perform the functions discussed above and below. For example, the media guidance application may provide instructions to control circuitry 804 to generate the media guidance displays. In some implementations, any action performed by control circuitry 804 may be based on instructions received from the media guidance application.

In client-server based embodiments, control circuitry 804 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media guidance data described above. Nonvolatile memory may also be used (e.g., to launch a boot-up routine and other instructions). Cloud-based storage, described in relation to FIG. 9, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of the user equipment 800. Circuitry 804 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of user equipment device 800. For example, display 812 may be a touchscreen or touch-sensitive display. In such circumstances, user input interface 810 may be integrated with or combined with display 812. Display 812 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 812 may be HDTV-capable. In some embodiments, display 812 may be a 3D display, and the interactive media guidance application and any suitable content may be displayed in 3D. A video card or graphics card may generate the output to the display 812. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 804. The video card may be integrated with the control circuitry 804. Speakers 814 may be provided as integrated with other elements of user equipment device 800 or may be stand-alone units. The audio component of videos and other content displayed on display 812 may be played through speakers 814. In some embodiments, the audio may be distributed to a receiver (not shown), which processes and outputs the audio via speakers 814.

The guidance application may be implemented using any suitable architecture. For example, it may be a stand-alone application wholly-implemented on user equipment device 800. In such an approach, instructions of the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected.

In some embodiments, the media guidance application is a client-server based application. Data for use by a thick or thin client implemented on user equipment device 800 is retrieved on-demand by issuing requests to a server remote to the user equipment device 800. In one example of a client-server based guidance application, control circuitry 804 runs a web browser that interprets web pages provided by a remote server. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on equipment device 800. This way, the processing of the instructions is performed remotely by the server while the resulting displays are provided locally on equipment device 800. Equipment device 800 may receive inputs from the user via input interface 810 and transmit those inputs to the remote server for processing and generating the corresponding displays. For example, equipment device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to equipment device 800 for presentation to the user.

In some embodiments, the media guidance application is downloaded and interpreted or otherwise run by an interpreter or virtual machine (run by control circuitry 804). In some embodiments, the guidance application may be encoded in the ETV Binary Interchange Format (EBIF), received by control circuitry 804 as part of a suitable feed, and interpreted by a user agent running on control circuitry 804. For example, the guidance application may be an EBIF application. In some embodiments, the guidance application may be defined by a series of JAVA-based files that are received and run by a local virtual machine or other suitable middleware executed by control circuitry 804. In some of such embodiments (e.g., those employing MPEG-2 or other digital media encoding schemes), the guidance application may be, for example, encoded and transmitted in an MPEG-2 object carousel with the MPEG audio and video packets of a program.

Figure 9:
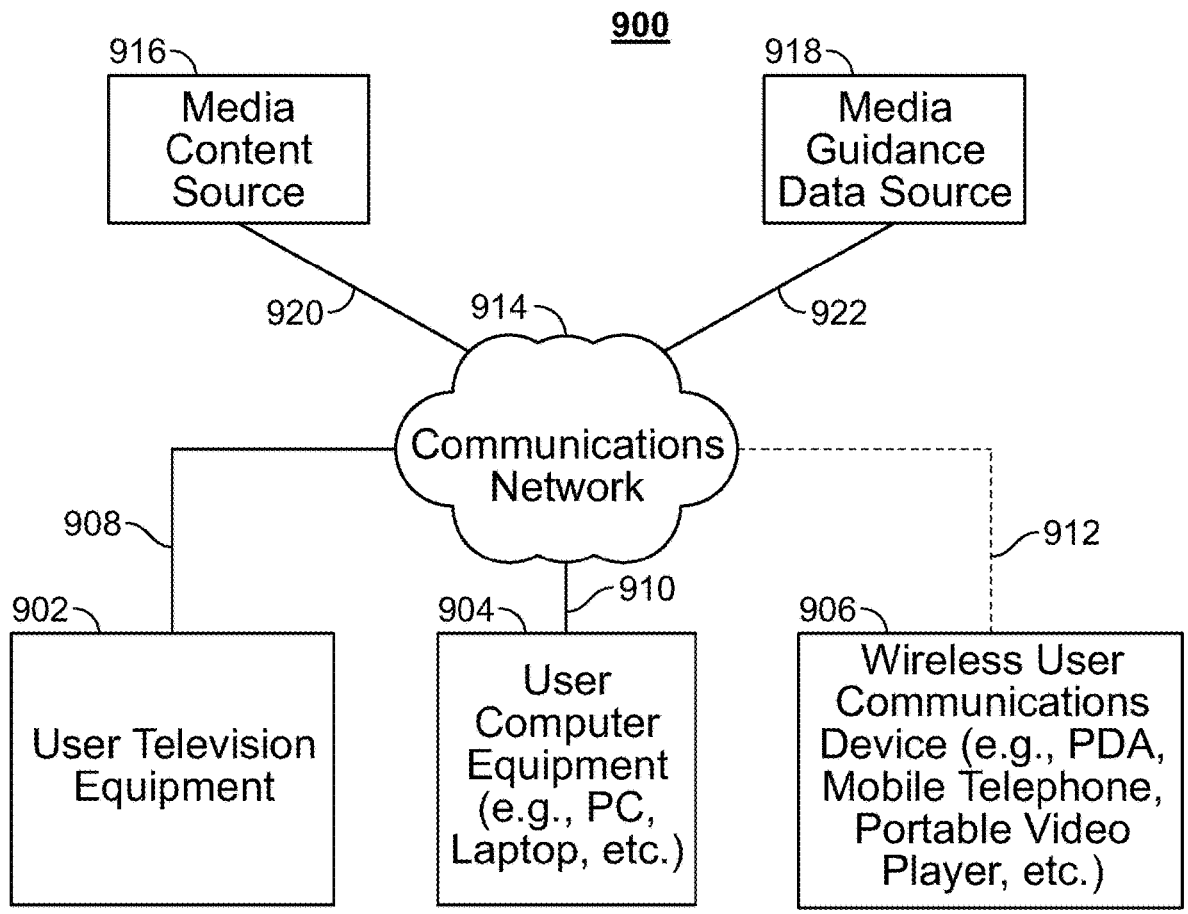
FIG. 9 is a block diagram of an illustrative media system, in accordance with some embodiments of the disclosure.

User equipment device 800 of FIG. 8 can be implemented in system 900 of FIG. 9 as user television equipment 902, user computer equipment 904, wireless user communications device 906, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 8 may not be classified solely as user television equipment 902, user computer equipment 904, or a wireless user communications device 906. For example, user television equipment 902 may, like some user computer equipment 904, be Internet-enabled allowing for access to Internet content, while user computer equipment 904 may, like some television equipment 902, include a tuner allowing for access to television programming. The media guidance application may have the same layout on various different types of user equipment or may be tailored to the display capabilities of the user equipment. For example, on user computer equipment 904, the guidance application may be provided as a web site accessed by a web browser. In another example, the guidance application may be scaled down for wireless user communications devices 906.

In system 900, there is typically more than one of each type of user equipment device but only one of each is shown in FIG. 9 to avoid overcomplicating the drawing. In addition, each user may utilize more than one type of user equipment device and also more than one of each type of user equipment device.

In some embodiments, a user equipment device (e.g., user television equipment 902, user computer equipment 904, wireless user communications device 906) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile voice or data network (e.g., a 4G or LTE network), cable network, public switched telephone network, or other types of communications network or combinations of communications networks. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 914.

System 900 includes content source 916 and media guidance data source 918 coupled to communications network 914 via communication paths 920 and 922, respectively. Paths 920 and 922 may include any of the communication paths described above in connection with paths 908, 910, and 912. Communications with the content source 916 and media guidance data source 918 may be exchanged over one or more communications paths, but are shown as a single path in FIG. 9 to avoid overcomplicating the drawing. In addition, there may be more than one of each of content source 916 and media guidance data source 918, but only one of each is shown in FIG. 9 to avoid overcomplicating the drawing. (The different types of each of these sources are discussed below.) If desired, content source 916 and media guidance data source 918 may be integrated as one source device. Although communications between sources 916 and 918 with user equipment devices 902, 904, and 906 are shown as through communications network 914, in some embodiments, sources 916 and 918 may communicate directly with user equipment devices 902, 904, and 906 via communication paths (not shown) such as those described above in connection with paths 908, 910, and 912.

Content source 916 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 916 may be the originator of content (e.g., a television broadcaster, a Webcast provider, etc.) or may not be the originator of content (e.g., an on-demand content provider, an Internet provider of content of broadcast programs for downloading, etc.). Content source 916 may include cable sources, satellite providers, on-demand providers, Internet providers, over-the-top content providers, or other providers of content. Content source 916 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 918 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 918 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 918 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 918 may provide user equipment devices 902, 904, and 906 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 808, and executed by control circuitry 804 of a user equipment device 800. In some embodiments, media guidance applications may be client-server applications where only a client application resides on the user equipment device, and server application resides on a remote server. For example, media guidance applications may be implemented partially as a client application on control circuitry 804 of user equipment device 800 and partially on a remote server as a server application (e.g., media guidance data source 918) running on control circuitry of the remote server. When executed by control circuitry of the remote server (such as media guidance data source 918), the media guidance application may instruct the control circuitry to generate the guidance application displays and transmit the generated displays to the user equipment devices. The server application may instruct the control circuitry of the media guidance data source 918 to transmit data for storage on the user equipment. The client application may instruct control circuitry of the receiving user equipment to generate the guidance application displays.

Content and/or media guidance data delivered to user equipment devices 902, 904, and 906 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 900 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 9.

In one approach, user equipment devices may communicate with each other within a home network. User equipment devices can communicate with each other directly via short-range point-to-point communication schemes described above, via indirect paths through a hub or other similar device provided on a home network, or via communications network 914. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 916 to access content. Specifically, within a home, users of user television equipment 902 and user computer equipment 904 may access the media guidance application to navigate among and locate desirable content. Users may also access the media guidance application outside of the home using wireless user communications devices 906 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 914. These cloud resources may include one or more content sources 916 and one or more media guidance data sources 918. In addition or in the alternative, the remote computing sites may include other user equipment devices, such as user television equipment 902, user computer equipment 904, and wireless user communications device 906. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 904 or wireless user communications device 906 having content capture feature. Alternatively, the user can first transfer the content to a user equipment device, such as user computer equipment 904. The user equipment device storing the content uploads the content to the cloud using a data transmission service on communications network 914. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 8.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It should be noted that the controls discussed in FIG. 1, including external trigger 102, control 104, measurements 106, B/W Control 108, communication control 110, and control 112, may each have control circuitry 804 (FIG. 8) components. In some embodiments, the controls may also collectively share the same control circuitry 804 components. For example, the media guidance application on the broadcast server may have control circuitry 804 and the media guidance application on the set-top box may have its own control circuitry 804. This allows the controls to process and store data accordingly.

Figure 10:
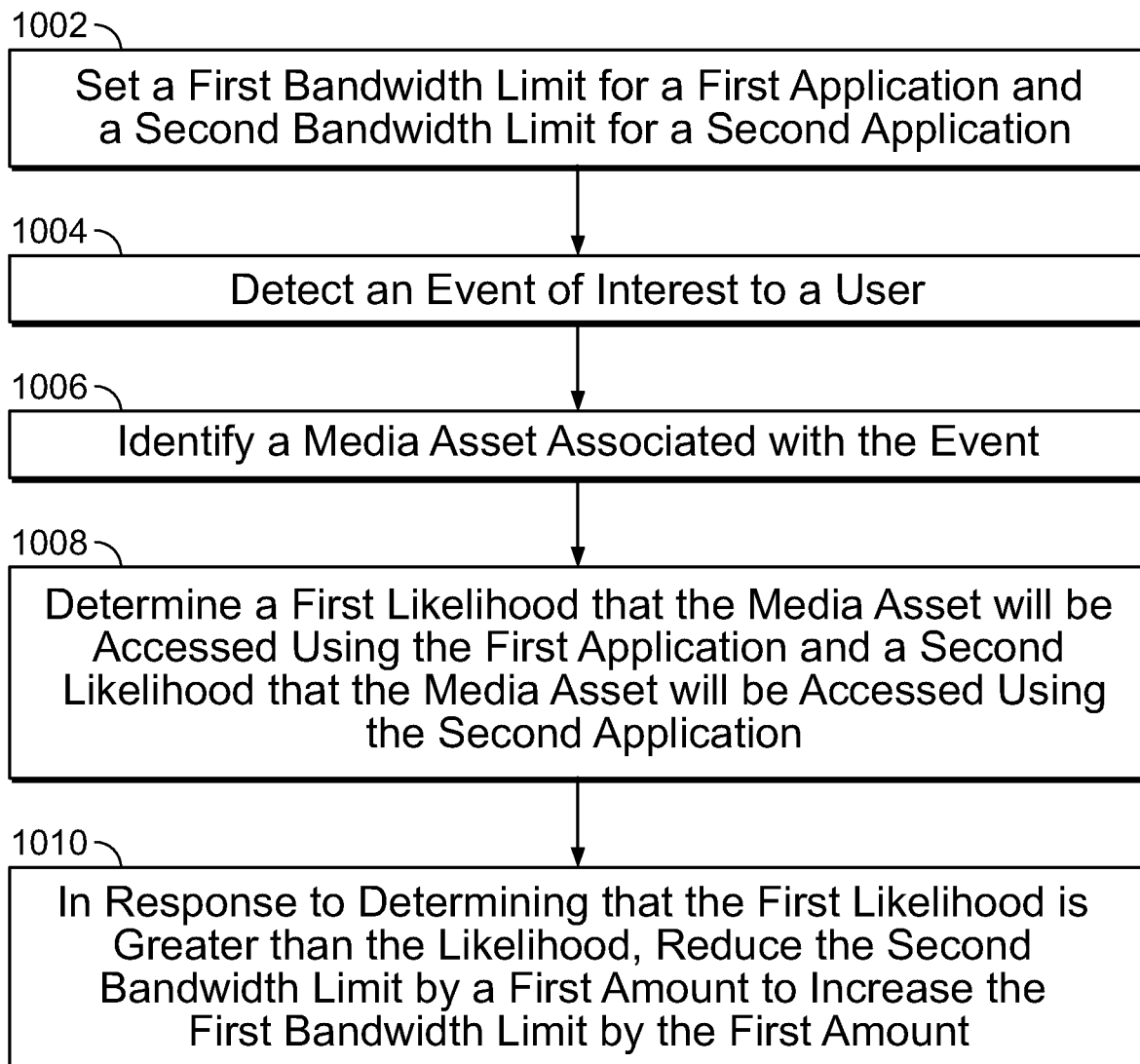
FIG. 10 is a flowchart of an illustrative process for adjusting bandwidth limits of applications based on the application's usage likelihood, in accordance with some embodiments of the disclosure.

FIG. 10 is a flowchart of illustrative steps of a process 1000 for adjusting bandwidth limits of applications based on the application's usage likelihood, in accordance with some embodiments of the disclosure. It should be noted that process 1000 or any step thereof could be performed on, or provided by, any of the devices shown in FIGS. 8-9. For example, process 1000 may be executed by control circuitry 804 (FIG. 8) as instructed by a media guidance application implemented on a user device (e.g., user equipment devices 902, 904, and/or 906 (FIG. 9)) in order to adjust bandwidth limits of applications based on the application's usage likelihood. In addition, one or more steps of process 1000 may be incorporated into or combined with one or more steps of any other process or embodiment (e.g., as described in relation to FIGS. 1 and 11-15).

At step 1002, control circuitry 804 (FIG. 8) of B/W Control 108 (FIG. 1) sets a first bandwidth limit for a first application and a second bandwidth limit for a second application. As discussed previously, a bandwidth limit represents the maximum bandwidth an application can utilize. Control circuitry 804 refers to storage 808 of measurements 106 to retrieve usage statistics. Based on usage statistics, control circuitry 804 may set the first bandwidth limit and the second bandwidth limit accordingly, in a bandwidth limit database in storage 808 of B/W Control 108. For example, control circuitry 804 may determine that the usage statistics indicate that the first application (e.g., Facebook) uses 5 Mbps when streaming videos, a media asset that the user primarily accesses. Therefore, the first bandwidth limit may be set to 5 Mbps.

At step 1004, control circuitry 804 (FIG. 8) of external trigger 102 (FIG. 1) detects an event of interest to a user. For example, control circuitry 804 may monitor incoming network packets with the user's IP address as the destination. Control circuitry 804 may parse the payload of each network packet to determine an event. For example, control circuitry 804 may detect a social media status update. Control circuitry 804 may then refer to storage 808 of control 104 to retrieve a list of events. The list of events may indicate that the user is interested in being notified about social media posts. Control circuitry 804 may extract metadata associated with each event in the list of events along with the detected events. Suppose that the metadata indicates that the detected event's event type is social media post and the associated applications are Twitter and Facebook. Furthermore, suppose that the list of events contains an event with the same metadata. Control circuitry 804 may determine that the detected event matches an event in the list of events. Therefore, the detected event is of interest to the user.

At step 1006, control circuitry 804 (FIG. 8) of control 104 (FIG. 1) identifies a media asset associated with the event. Control circuitry 804 may refer to the payloads of network packets to determine the type of media assets associated with the event. For example, control circuitry 804 may determine that the media asset associated with the social media status update is a combination of text and graphics (e.g., photos, emojis, GIF, etc.) based on the information in the payload of the network packet. Control circuitry 804 may also refer to the metadata of an application that is associated with the event to determine the type of events associated with the application. For example, an application such as YouTube may indicate that compatible media assets are videos. Therefore, control circuitry 804 may determine that events associated with YouTube are also associated with media assets that are videos.

At step 1008, control circuitry 804 (FIG. 8) of control 104 (FIG. 1) determines a first likelihood that the media asset will be accessed using the first application and a second likelihood that the media asset will be accessed using the second application. Control circuitry 804 may retrieve usage statistics from storage 808 of measurements 106 to determine respective likelihoods. For example, control circuitry 804 may determine that the usage statistics of the first application (e.g., Facebook) indicate daily usage and the usage statistics of a second application (e.g., Twitter) indicate that it is rarely used (e.g., once a year). Control circuitry 804 may utilize a probabilistic model to determine that the user has a 99% likelihood of accessing the media asset on Facebook and 1% likelihood of accessing the media asset on Twitter.

At step 1010, in response to determining that the first likelihood is greater than the second likelihood, control circuitry 804 (FIG. 8) of B/W Control 108 (FIG. 1) reduces the second bandwidth limit by a first amount to increase the first bandwidth limit by the first amount. Suppose that the media asset requires a bandwidth of 2.5 Mbps. In order to access the media asset on Facebook, the first bandwidth limit needs to be increased by a first amount of 0.5 Mbps. Control circuitry 804 may decrease the second bandwidth limit by 0.5 Mbps and increase the first bandwidth limit by 0.5 Mbps in a bandwidth limit database.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 10.

In previous examples, the media guidance application primarily dealt with social media applications that share the same media assets (e.g., Facebook and Instagram share photos and videos). However, it should be noted that the media guidance application is effective in adjusting bandwidth limits for non-related media applications. For example, one application may deal with video streaming and another may deal with news updates. Accordingly, the media assets associated with the first application may be video streams and the media assets associated with the second application may be photos, news stories and videos.

Figure 11:
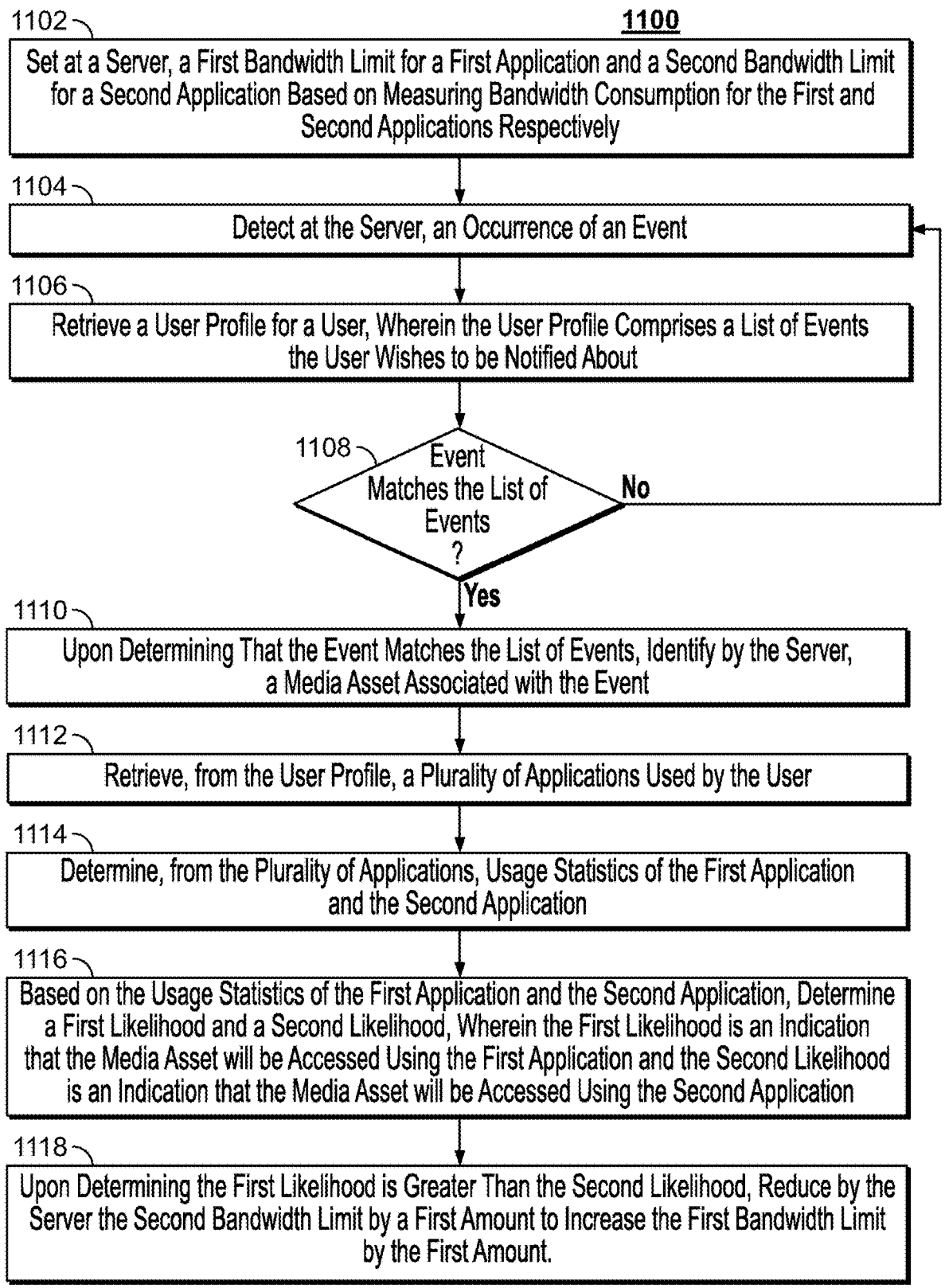
FIG. 11 is a flowchart of a detailed illustrative process for adjusting bandwidth limits of applications based on the application's usage likelihood, in accordance with some embodiments of the disclosure.

FIG. 11 is a flowchart of illustrative steps of a process 1100 for adjusting bandwidth limits of applications based on the application's usage likelihood, in accordance with some embodiments of the disclosure. It should be noted that process 1100 or any step thereof could be performed on, or provided by, any of the devices shown in FIGS. 8-9. For example, process 1100 may be executed by control circuitry 804 (FIG. 8) as instructed by a media guidance application implemented on a user device (e.g., user equipment devices 902, 904, and/or 906 (FIG. 9)) in order to adjust bandwidth limits of applications based on the application's usage likelihood. In addition, one or more steps of process 1100 may be incorporated into or combined with one or more steps of any other process or embodiment (e.g., as described in relation to FIGS. 1, 10, 12-15).

At step 1102, control circuitry 804 (FIG. 8) of B/W Control 108 (FIG. 1) sets, at the server, a first bandwidth limit for a first application and a second bandwidth limit for a second application, based on measuring bandwidth consumption for the first and second applications respectively. For example, suppose that the first application is ESPN and the second application is Yahoo Weather. Control circuitry 804 may retrieve usage statistics of ESPN and Yahoo Weather from storage 808 of measurements 106. The usage statistics are generated by control circuitry 804 of measurements 106, which monitors user activity. While usage statistics may account for user-specific application usage, if the user does not have history of usage, the usage statistics may be based on multiple test results from multiple set-top boxes for various users (e.g., other users in the household or users in the same geographic region). Based on how often an application is used, the types of media assets accessed, and the bandwidth utilized per usage, B/W Control 108 may set, for example, the first bandwidth limit for ESPN as 5 Mbps. Likewise, the second bandwidth limit for Yahoo Weather may be 1 Mbps.

At step 1104, control circuitry 804 (FIG. 8) of external trigger 102 (FIG. 1) detects, at the server, an occurrence of an event. For example, control circuitry 804 may monitor incoming network packets and parse the payloads of each packet that have the destination set to the user's IP address. Based on the data in the payloads of a combination of network packets (e.g., a complete message may be split across multiple network packets), control circuitry 804 may determine an event (e.g., a weather alert of an approaching hurricane). External trigger 102 may communicate with control 104 to determine whether the event is of interest to the user.

At step 1106, control circuitry 804 (FIG. 8) of control 104 (FIG. 1) retrieves a user profile for a user, wherein the user profile comprises a list of events the user wishes to be notified about. Control circuitry 804 may access a user profile from storage 808 that includes information about the applications the user has accessed, the duration of access, time stamps, and a list of events the user is interested in. For example, the list of events may indicate that user is interested in social media posts, news updates, weather updates, and live streams.

At step 1108, control circuitry 804 (FIG. 8) of control 104 (FIG. 1) determines whether the event matches the list of events. For example, control circuitry 804 may extract the metadata associated with the event. The metadata may indicate the type and the description of the event. Control circuitry 804 may determine that the event detected is a weather update based on the metadata. Upon referring to the user's list of events, control circuitry 804 may determine that the event matches the list of events.

At step 1110, in response to determining that the event matches the list of events, control circuitry 804 (FIG. 8) of control 104 (FIG. 1) identifies a media asset associated with the event. If control circuitry 804 (FIG. 8) of control 104 (FIG. 1) determines that the event does not match the list of events, the process returns to step 1104 and may detect a new event. For example, control circuitry 804 may determine that the weather alert is an interactive media interface (e.g., media asset) that provides real-time details about the hurricane such as trajectory, classification, wind strength, rainfall estimations, etc.

At step 1112, control circuitry 804 (FIG. 8) of control 104 (FIG. 1) retrieves, from the user profile, a plurality of applications used by the user. For example, measurements 106 may have storage 808 with an application database that lists all of the applications used by the user.

At step 1114, control circuitry 804 (FIG. 8) of measurements 106 (FIG. 1) determines, from the plurality of applications, usage statistics of the first application and the second application. The application database may also provide information about usage statistics. For example, the database may indicate that the user accesses ESPN every day for two hours between 8:00 pm and 10:00 pm. Furthermore, the database may indicate that Yahoo Weather is used on a daily basis in the mornings for one minute between 9:00 am and 9:01 am.

At step 1116, based on the usage statistics of the first application and the second application, control circuitry 804 (FIG. 8) of control 104 (FIG. 1) determines a first likelihood and a second likelihood, wherein the first likelihood is an indication that the media asset will be accessed using the first application and the second likelihood is an indication that the media asset will be accessed using the second application. In some embodiments, control 104 may have storage 808, which includes an event database that lists different types of events and identifies their associated applications. In the example given, a weather update may not be associated with ESPN. Instead, events such as game updates, player profiles and game highlights may be associated with ESPN. Control circuitry 804 may therefore determine that weather updates are only accessible on Yahoo Weather and not ESPN. The second likelihood (e.g., weather update being accessed by Yahoo Weather) may be 99% and the first likelihood (e.g., weather update being accessed by ESPN) may be 1%.

However, it is possible that ESPN can provide weather updates in the context of sporting events (e.g., game cancellations due to hurricane). In this case, control circuitry 804 may determine, based on the usage statistics, that ESPN is accessed for weather update media alerts only 1% of the time (e.g., out of 100 hours of ESPN access, only 1 hour was devoted to stories related to weather). In contrast, Yahoo Weather may solely be used for weather updates 100% of the time. These usage statistics may be used by control circuitry 804 to determine that the first likelihood is 10% and the second likelihood is 90%.

At step 1118, upon determining the first likelihood is greater than the second likelihood, control circuitry 804 (FIG. 8) of B/W Control 108 (FIG. 1) reduces, at the server, the second bandwidth limit by a first amount to increase the first bandwidth limit by a first amount. Suppose the media asset, the interactive media interface of the hurricane tracker, requires 5 Mbps of bandwidth to function normally. The bandwidth limit for Yahoo Weather may be 1 Mbps and the bandwidth limit for ESPN may be 5 Mbps. Furthermore, the network may not have additional free bandwidth. Control circuitry 804 may therefore reduce the bandwidth limit for ESPN by 4 Mbps, the first amount, and add it to the bandwidth limit of Yahoo Weather. Thus, the bandwidth limits become 1 Mbps and 5 Mbps, respectively.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 11.

Figure 12:
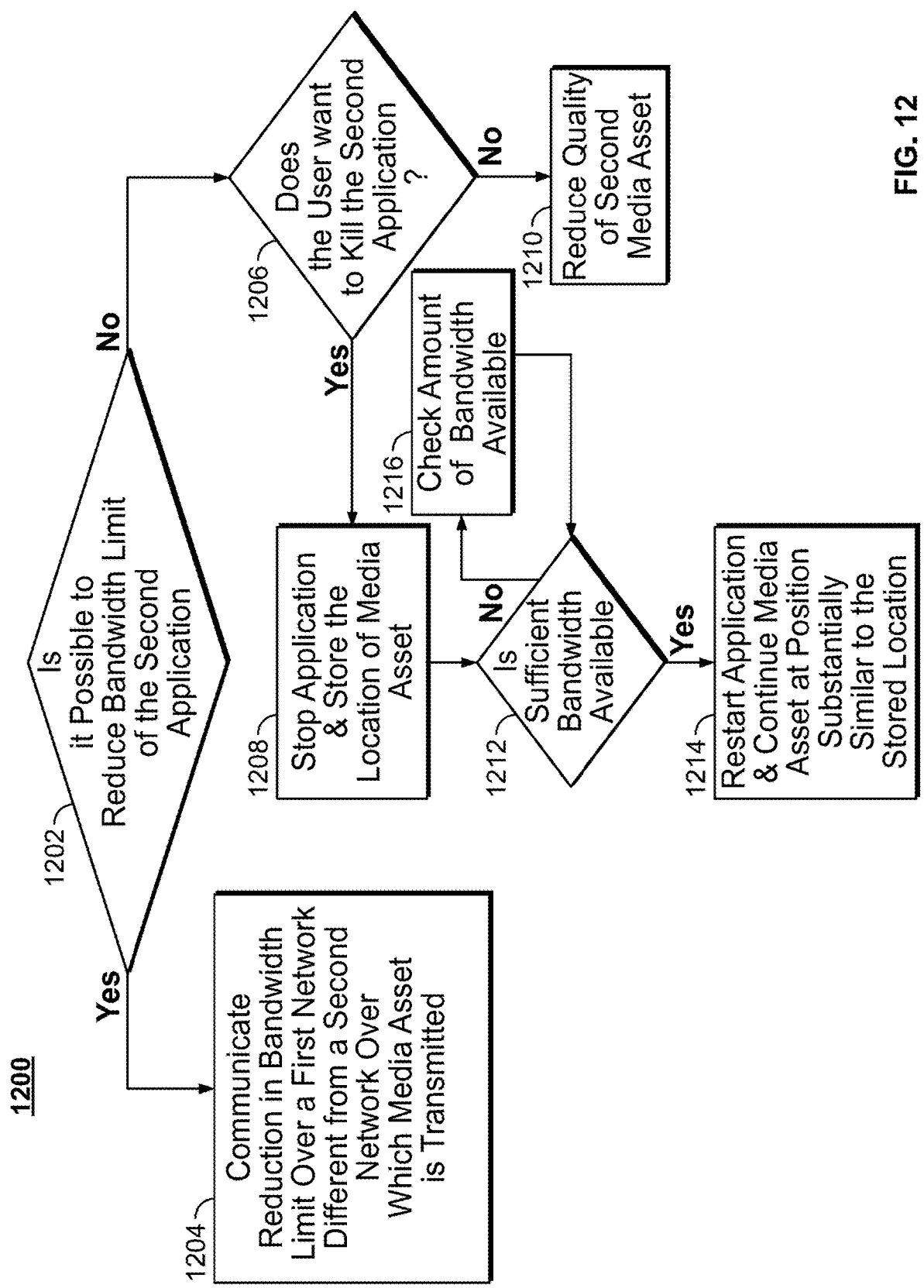
FIG. 12 is a flowchart of a detailed illustrative process for reducing bandwidth consumption of a second application, in accordance with some embodiments of the disclosure.

FIG. 12 is a flowchart of illustrative steps of a process 1200 for reducing bandwidth consumption of a second application, in accordance with some embodiments of the disclosure. It should be noted that process 1200 or any step thereof could be performed on, or provided by, any of the devices shown in FIGS. 8-9. For example, process 1200 may be executed by control circuitry 804 (FIG. 8) as instructed by a media guidance application implemented on a user device (e.g., user equipment devices 902, 904, and/or 906 (FIG. 9)) in order to reduce bandwidth consumption of a second application. In addition, one or more steps of process 1200 may be incorporated into or combined with one or more steps of any other process or embodiment (e.g., as described in relation to FIGS. 1, 10-11, 13-15).

At step 1202, control circuitry 804 (FIG. 8) of control 112 (FIG. 1) determines whether the bandwidth limit of the second application can be reduced. For example, control circuitry 804 may determine that the user is accessing a second media asset on the second application. Suppose that the user is watching a video on the second application, YouTube. Control circuitry 804 may determine that the second application is utilizing 8 Mbps of bandwidth. If the bandwidth is reduced, the video being viewed may stop. Therefore, control circuitry 804 may determine that the bandwidth limit of the second application cannot be reduced.

Furthermore, control circuitry 804 may refer to the user's profile in storage 808 to retrieve a priority list. The priority list may provide details about the importance of various events. For example, an emergency weather alert may have a higher priority than a social media post. If the second media asset being accessed is associated with an emergency weather alert, control circuitry 804 may determine that the bandwidth limit cannot be reduced in favor of a social media update. Similarly, if an application is accessing a social media post and an emergency weather alert is detected by control circuitry 804 of external trigger 102, control circuitry 804 may determine that the bandwidth limit of the social media application can be reduced.

At step 1204, in response to determining that the bandwidth limit of the second application can be reduced, control circuitry 804 (FIG. 8) of control 112 (FIG. 1) communicates reduction in the bandwidth limit over a first network different from a second network over which the media asset is transferred. For example, control circuitry 804 may send a control message to the control circuitry 804 of B/W Control 108 through communication control 110. If the media asset is being transferred from the server to the set-top box over a Wi-Fi network, control messages between the server and the set-top box may be transferred over a cellular network. In response to the control message, control circuitry 804 of B/W Control 108 may reduce the bandwidth limit of the second application and send a control message to control 112 confirming the change.

In some embodiments, control circuitry 804 (FIG. 8) of control 112 (FIG. 1) may recommend applications from which bandwidth may be borrowed, to make up for the additional bandwidth that may be needed by the first application. For example, the first application may need 5 Mbps of additional bandwidth. B/W Control 108 (FIG. 1) may identify the applications that are running on the user's device and may determine the amount of bandwidth being utilized by each application. In a scenario in which two applications, Twitter and Instagram, have respective bandwidth limits, 5 Mbps and 4 Mbps, B/W Control 108 may determine that the applications are only accessing photos and are thus each utilizing 1 Mbps of the total bandwidth. Accordingly, B/W Control 108 may determine that the bandwidth limits of Twitter and Instagram can be reduced and communicate a recommendation through communication control 110 to control 112 of reducing the bandwidth limit of Twitter and Instagram. B/W Control 108 may also automatically reduce the bandwidth limits.

At step 1206, in response to determining that the bandwidth limit of the second application cannot be reduced, control circuitry 804 (FIG. 8) of control 112 (FIG. 1) prompts the user to choose whether the second application should be killed. For example, control circuitry 804 may generate a user input interface 810 on display 812 that resembles overlay 504 in FIG. 5. The user may choose to quit the application or allow the application to continue running via I/O path 802.

At step 1208, in response to the user opting to kill the second application (e.g., confirming selection via I/O Path 802 of control 112 (FIG. 1)), control circuitry 804 (FIG. 8) of control 112 stops the application and stores the position of the media asset in a media asset database. The media asset database may include a list of media assets, their associated application, metadata associated with the media asset, and the positions at which the media assets were last closed. For example, the media asset database may list a video associated with YouTube. The media asset database may indicate that the user closed the video at certain point (e.g., 5 minute 23 seconds into the video). Therefore, in response to the user's selection to kill the second application, control circuitry 804 may close and application and store the position at which the media asset was last accessed in the media asset database.

At step 1210, in response to the user choosing not to kill the second application (e.g., confirming selection via I/O Path 802 of control 112 (FIG. 1)), control circuitry 804 (FIG. 8) of control 112 reduces the quality of the second media asset. For example, control circuitry 804 may display the second media asset at a lower resolution. If the media guidance application was originally displaying the second media asset in high definition, control circuitry 804 may change the resolution to standard definition. Doing so would free up bandwidth because the standard definition requires less bandwidth to display.

In some embodiments, control circuitry 804 may reduce the quality of the first media asset. For example, the first media asset associated with the detected event may be a photo. Control circuitry 804 may downsample the photo. This reduces the bandwidth requirements of the first media asset. In some embodiments, both media assets may be reduced in quality by control circuitry 804 to free up bandwidth.

In some embodiments, control circuitry 804 may present the media asset in an alternate medium in order to reduce bandwidth utilization of the second application. For example, control circuitry 804 may determine the user is accessing a second application, ESPN, which is displaying a video of a football game. Control circuitry 804 may remove the visual portion of the video such that the media asset becomes solely audio (e.g., commentary of the football game). In another example, the control circuitry 804 may present the summary of each play of the football game in text format. This may be done by extracting subtitles from the video, or retrieving play-by-play text from the Internet.

At step 1212, control circuitry 804 (FIG. 8) of B/W Control 108 (FIG. 1) determines whether there is sufficient bandwidth available in the network. This step may occur once control circuitry 804 determines that the user has finished accessing the first media asset. Control circuitry 804 may monitor the total bandwidth in the network and update a bandwidth database accordingly. The bandwidth database may provide details about the applications that have or are consuming bandwidth in the network. Suppose that the total bandwidth in the network is 20 Mbps and five applications are running simultaneously. Each application may utilize 1 Mbps. Therefore, control circuitry 804 may determine, based on the bandwidth database, that a total of 5 Mbps is utilized in the network and 15 Mbps is still available.

At step 1214, in response to determining that there is sufficient bandwidth available, control circuitry 804 (FIG. 8) of control 112 (FIG. 1) restarts the second application and continues the media asset at a position substantially similar to the stored location. For example, upon determining that 15 Mbps is available and that the second media asset (e.g., video) of the second application (e.g., YouTube) requires 8 Mbps, control circuitry 804 may retrieve the position at which to restart the media asset on the second application from the media asset database. For example, control circuitry 804 may retrieve a 5 minute 23 seconds position marker associated with the video playing on YouTube. Control circuitry 804 may then restart the second application, YouTube, and continue playback of the video from the 5 minute 23 seconds mark. In some instances, control circuitry 804 may begin playback from a threshold time before or after the position at which the media asset was stopped. For example, control circuitry 804 may start the video at the 5-minute mark to allow the user to recap where he/she left off.

At step 1216, in response to determining that there is not sufficient bandwidth available, control circuitry 804 (FIG. 8) of B/W Control 108 (FIG. 1) checks the amount of bandwidth available in the network. This process runs in a loop with step 1212 until bandwidth is available. Control circuitry 804 may end the loop if another application that is utilizing bandwidth in the network stops running, thus freeing additional bandwidth.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 12.

Figure 13:
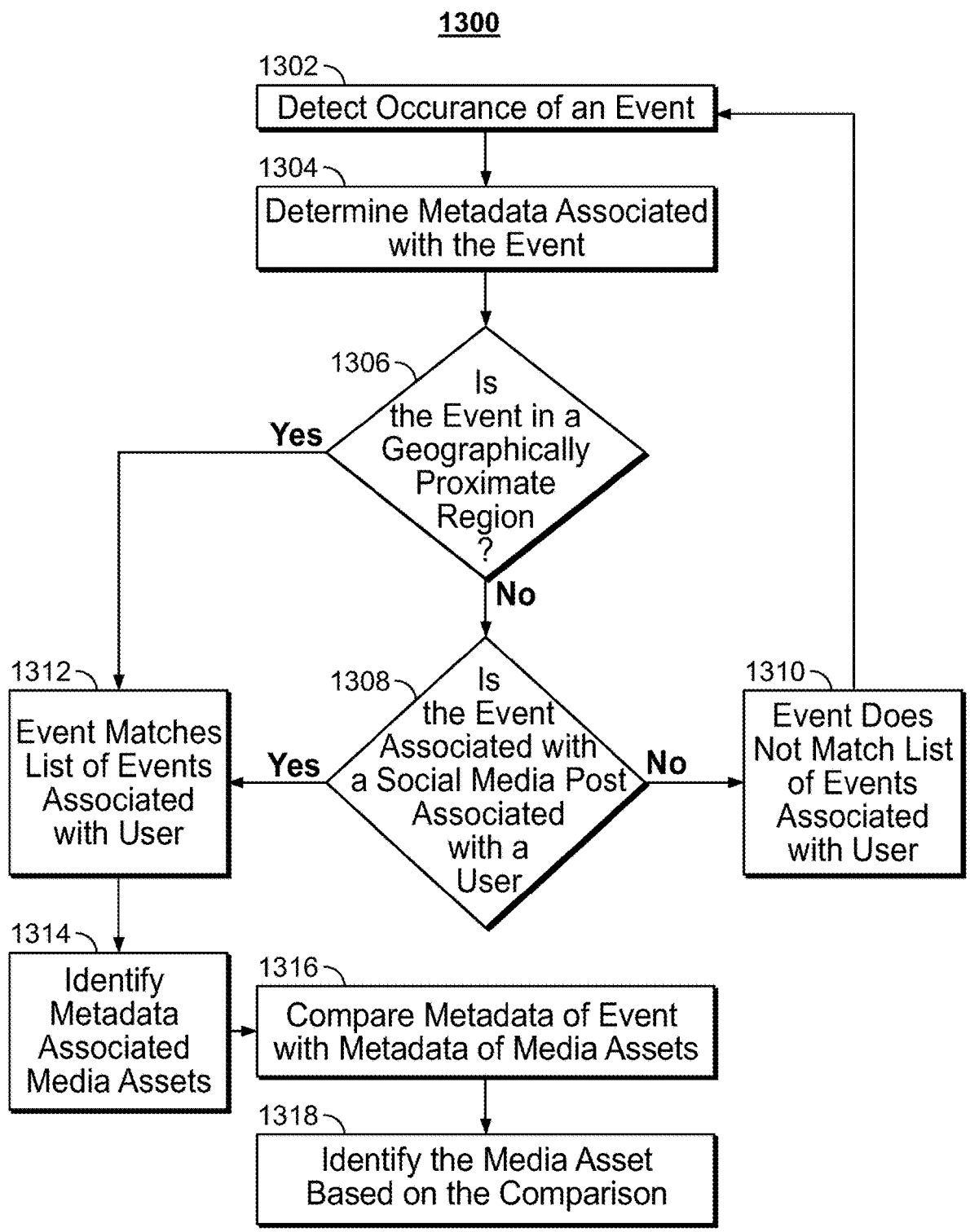
FIG. 13 is a flowchart of a detailed illustrative process for detecting the occurrence of an event and identifying associated media assets, in accordance with some embodiments of the disclosure.

FIG. 13 is a flowchart of illustrative steps of a process 1300 for detecting the occurrence of an event and identifying associated media assets, in accordance with some embodiments of the disclosure. It should be noted that process 1300 or any step thereof could be performed on, or provided by, any of the devices shown in FIGS. 8-9. For example, process 1300 may be executed by control circuitry 804 (FIG. 8) as instructed by a media guidance application implemented on a user device (e.g., user equipment devices 902, 904, and/or 906 (FIG. 9)) in order to detect the occurrence of an event and identify associated media assets. In addition, one or more steps of process 1300 may be incorporated into or combined with one or more steps of any other process or embodiment (e.g., as described in relation to FIGS. 1, 10-12, 14-15).

At step 1302, control circuitry 804 (FIG. 8) of external trigger 102 (FIG. 1) detects the occurrence of an event. For example, control circuitry 804 may monitor incoming network packets and parse the payloads of each packet that have the destination set to the user's IP address. Based on the data in the payloads of a combination of network packets (e.g., a complete message may be split across multiple network packets), control circuitry 804 may determine an event. For example, control circuitry 804 may detect an incoming weather alert of an approaching hurricane.

At step 1304, control circuitry 804 (FIG. 8) of control 104 (FIG. 1) determines metadata associated with the event. For example, control circuitry 804 may parse the header and payload of each incoming network packet associated with the event to extract metadata. The metadata may provide information about the event such as event type, event description, time stamps, associated media assets, and associated applications.

At step 1306, control circuitry 804 (FIG. 8) of control 104 (FIG. 1) determines whether the event is in a geographically proximate region. For example, the user may live in New York City and therefore indicate that he/she wishes to be notified of weather alerts in New York City on his/her user profile. Control circuitry 804 may determine, based on the data parsed from the network packet payloads, that the event is associated with New York City, a geographically proximate region.

At step 1308, in response to determining that the event is not in a geographically proximate region, control circuitry 804 (FIG. 8) of control 104 (FIG. 1) determines whether the event is associated with a social media post associated with a user. For example, control circuitry 804 may determine, based on the data parsed from the network packet payloads, that a weather alert event is associated with Hawaii. Since the alert is not associated with New York City, the geographically proximate region, control circuitry 804 may attempt to determine whether the event is associated with a social media post by referring back to the payloads of the incoming network packets associated with the event. In this example, control circuitry 804 may determine that the event is a weather update and is not a social media post.

At step 1312, if the event is either associated with a social media post associated with a user or is in a geographically proximate region, control circuitry 804 (FIG. 8) of control 104 (FIG. 1) determines that the event matches the list of events associated with the user. If the event is associated with a social media post, or is in a geographically proximate region (e.g., New York City), control circuitry 804 may determine that the event matches the user's list of events. The list of events may be retrieved from storage 808 of control 104. In contrast, at step 1310, if the event is not in a geographically proximate region and is not associated with a social media post associated with the user, control circuitry 804 (FIG. 8) of control 104 (FIG. 1) determines that the event does not match the list of events associated with the user. In response, the process returns to step 1302, as control circuitry 804 continues to detect other events.

At step 1314, control circuitry 804 (FIG. 8) of control 104 (FIG. 1) identifies metadata associated with the media asset. For example, control circuitry 804 may detect a media asset, such as a weather forecast graphic. Control circuitry 804 may extract the metadata associated with the media asset by referring to the media asset database. The metadata of the media asset may provide details such as media asset type (e.g., video, photo, game, etc.), description, time stamp and associated events.

At step 1316, control circuitry 804 (FIG. 8) of control 104 (FIG. 1) compares the metadata of the event with the metadata of the media assets. For example, the media asset may be a graphic of the hurricane's trajectory. Control circuitry 804 may determine, upon retrieving metadata associated with the media asset from the media asset database, that the media asset is associated with weather alert events. Similarly, control circuitry 804 may determine, based on the data parsed from the payloads of incoming network packets (e.g., used to generate event metadata), that the weather alert event is associated with graphics related to the hurricane.

At step 1318, based on the comparison of metadata, control circuitry 804 (FIG. 8) of control 104 (FIG. 1), identifies the media asset. For example, control circuitry 804 may identify the media asset because it relates to the event that matches the user's list of events. More specifically, control circuitry 804 may determine that the metadata of the media asset corresponds to the metadata of the event. In this case, control circuitry 804 may identify the graphic of the hurricane's trajectory as a media asset that relates to the weather alert event.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 13.

Figure 14:
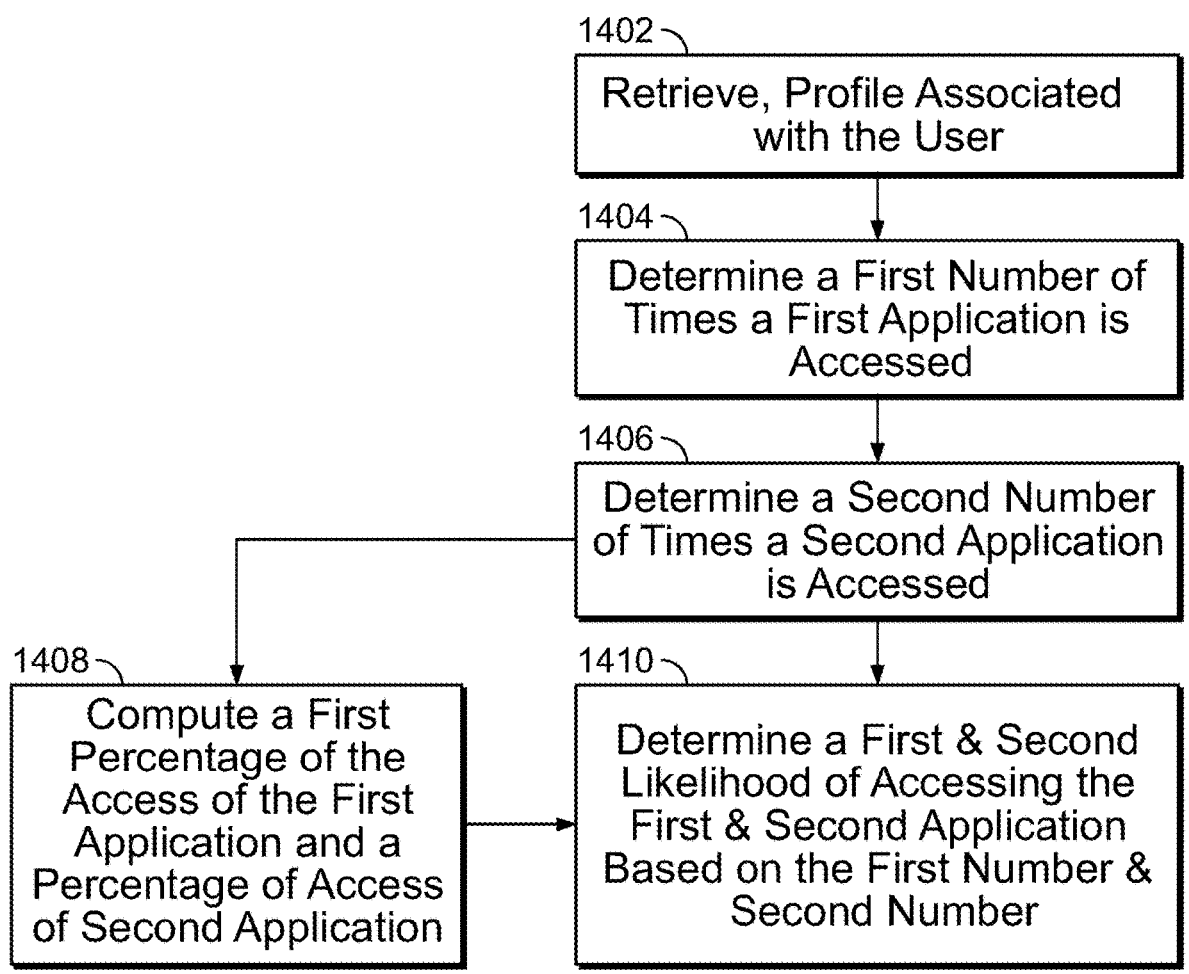
FIG. 14 is a flowchart of a detailed illustrative process for determining a first and second likelihood for a first and second application, respectively, in accordance with some embodiments of the disclosure.

FIG. 14 is a flowchart of illustrative steps of a process 1400 for determining a first and second likelihood for a first and second application, respectively, in accordance with some embodiments of the disclosure. It should be noted that process 1400 or any step thereof could be performed on, or provided by, any of the devices shown in FIGS. 8-9. For example, process 1400 may be executed by control circuitry 804 (FIG. 8) as instructed by a media guidance application implemented on a user device (e.g., user equipment devices 902, 904, and/or 906 (FIG. 9)) in order to determine a first and second likelihood for a first and second application, respectively. In addition, one or more steps of process 1400 may be incorporated into or combined with one or more steps of any other process or embodiment (e.g., as described in relation to FIGS. 1, 10-13, and 15).

At step 1402, control circuitry 804 (FIG. 8) of control 104 (FIG. 1) retrieves a user profile associated with the user. For example, control circuitry 804 may retrieve the user profile from storage 808. The user profile may track the user's application usage history. For example, the application usage history may indicate the application's name, a date when the user accessed the application, times when the user opened or closed the application, and the bandwidth conditions during the time the user accessed the application. Control circuitry 804 may populate the application usage history whenever a user accesses an application and may also increment the number of times an application is accessed.

At step 1404, control circuitry 804 (FIG. 8) of measurement 106 (FIG. 1) determines a first number of times a first application is accessed. Suppose that the first application is Facebook. The user profile may indicate, for example, that the user accessed Facebook 200 times ever since the user began using his/her set-top box.

At step 1406, control circuitry 804 (FIG. 8) of measurement 106 (FIG. 1) determines a second number of times a second application is accessed. Suppose that the second application is Instagram. The user profile may indicate, for example, that the user accessed Instagram 300 times ever since the user began using his/her set-top box.

In some embodiments, the user may use multiple local devices to access the applications. For example, the user may use computer equipment 904 or a wireless user communications device 906. The number of times an application is accessed may be based on the device used for access. For example, the user profile may indicate that Facebook was used 200 times on the user's set top box, 50 times on computer equipment, and 500 times on the user's smartphone.

At step 1408, control circuitry 804 (FIG. 8) of measurement 106 (FIG. 1) computes a first percentage of the access of the first application and a second percentage of the access of the second application. For example, control circuitry 804 may determine that the user used his/her set-top box for 300 hours. Of those 300 hours, control circuitry 804 may determine that the user spent 50 hours on Facebook and 10 hours on Instagram. Therefore, control circuitry 804 may determine that the first percentage of access of the first application, Facebook, is approximately 17% and the second percentage of access of the second application, Instagram, is 3.3%.

At step 1410, control circuitry 804 (FIG. 8) of control 104 (FIG. 1) determines a first and second likelihood of accessing the first and second application based on the first number/percentage and second number/percentage. Control circuitry 804 may consider both the number and the percentage for each application when determining the likelihood. Even if the user frequently uses one application more than another (e.g., has accessed the application a greater number of times), the user may spend more time on the other application. The user may indicate whether the media guidance application should use percentage or number for determining likelihoods via I/O path 802. Control circuitry 804 may store this setting in the user profile. In some embodiments, control circuitry 804 may utilize a likelihood algorithm that considers both duration and frequency of access.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 14.

Figure 15:
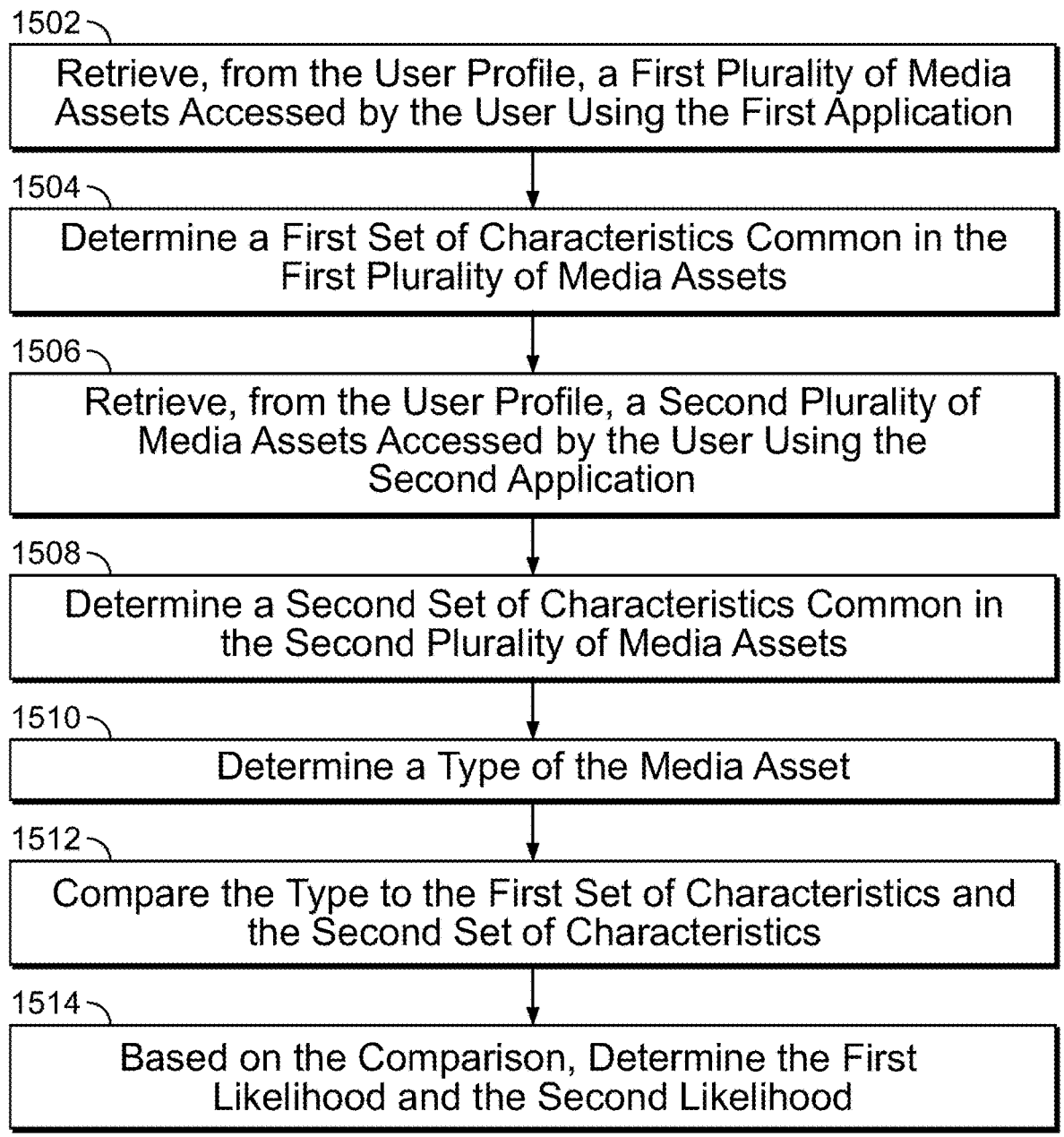
FIG. 15 is a flowchart of a detailed illustrative process for determining characteristics of media assets for comparison processes, in accordance with some embodiments of the disclosure.

FIG. 15 is a flowchart of illustrative steps of a process 1500 for determining characteristics of media assets for comparison processes, in accordance with some embodiments of the disclosure. It should be noted that process 1500 or any step thereof could be performed on, or provided by, any of the devices shown in FIGS. 8-9. For example, process 1500 may be executed by control circuitry 804 (FIG. 8) as instructed by a media guidance application implemented on a user device (e.g., user equipment devices 902, 904, and/or 906 (FIG. 9)) in order to determine characteristics of media assets for comparison processes. In addition, one or more steps of process 1500 may be incorporated into or combined with one or more steps of any other process or embodiment (e.g., as described in relation to FIGS. 1, and 10-14).

At step 1502, control circuitry 804 (FIG. 8) of control 104 (FIG. 1) retrieves, from the user profile in storage 808, a first plurality of media assets accessed by the user using the first application. For example, control circuitry 804 may refer to the media asset database in storage 808 of control 104. Control circuitry 804 may organize the database by application name to determine all the media assets associated with an application. For example, control circuitry 804 may determine that a first application, ESPN, is used to access media assets such as videos of baseball highlights, photos of baseball games, injury status updates, and game schedules.

At step 1504, control circuitry 804 (FIG. 8) of control 104 (FIG. 1) determines a first set of characteristics common to the first plurality of media assets. For example, the control circuitry 804 may determine that there is commonality between the photos and videos the user accesses because they are related to baseball. Control circuitry 804 may determine this by retrieving the metadata of both media assets from the media asset database, and using natural language processing and keywords to identify similar words. Therefore, the first set of characteristics common to the first plurality of media assets may be media assets associated with baseball (e.g., videos of homeruns, press conference photos, etc.).

At step 1506, control circuitry 804 (FIG. 8) of control 104 (FIG. 1) retrieves, from the user profile, a second plurality of media assets accessed by the user using a second application. For example, control circuitry 804 may determine that the user uses Yahoo Weather to view graphics and videos of weather forecasts.

At step 1508, control circuitry 804 (FIG. 8) of control 104 (FIG. 1) determines a second set of characteristics common to the second plurality of media assets. For example, control circuitry 804 may determine that the metadata of both media assets indicate an association with weather forecasts. Therefore, the second set of characteristics may include various types of media associated with weather forecasts.

At step 1510, control circuitry 804 (FIG. 8) of control 104 (FIG. 1) determines a type of the media asset. For example, control circuitry 804 may refer to the media asset database in storage 808 of control 104. Control circuitry 804 may organize the database by application name to determine all the media assets associated with an application. For example, control circuitry 804 may determine that a second application, ESPN, is used to access media assets such as videos of baseball highlights, photos of baseball games, injury status updates, and game schedules.

At step 1512, control circuitry 804 (FIG. 8) of control 104 (FIG. 1) compares the type of the media asset to the first set of characteristics and the second set of characteristics. For example, control circuitry 804 may determine that the weather forecast graphic is not associated with baseball, based on the metadata of the weather alert media asset. Alternatively, control circuitry 804 may confirm that the weather forecast graphic is associated with the second set of characteristics because they list weather updates and forecasts.

At step 1514, based on the comparison, control circuitry 804 (FIG. 8) of control 104 (FIG. 1) determines the first likelihood and the second likelihood. In the example given, control circuitry 804 may use a likelihood algorithm to determine the respective likelihood. For example, the likelihood algorithm may indicate that the second likelihood (e.g., 90%) is greater than the first likelihood (e.g., 5%) because the second set of characteristics match the type of the media asset (e.g., the user is more likely to access the second application, Yahoo Weather, to access the weather forecast graphic).

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 8-9 could be used to perform one or more of the steps in FIG. 15.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of dynamically adapting network performance parameters for applications, the method comprising:

setting a first bandwidth limit for a first application and a second bandwidth limit for a second application;

detecting an event of interest to a user;

identifying a media asset associated with the event;

determining a first likelihood that the media asset will be accessed using the first application and a second likelihood that the media asset will be accessed using the second application; and in response to determining that the first likelihood is greater than the second likelihood, reducing the second bandwidth limit by a first amount to increase the first bandwidth limit by the first amount.

2. The method of claim 1, further comprising:

determining that the second bandwidth limit cannot be reduced as the second application is accessing a second media asset consuming bandwidth up to the second bandwidth limit;

upon determining that the second bandwidth limit cannot be reduced, determining a first quality associated with a first bit consumption rate of the second media asset; and reducing the quality of the second media asset from the first quality to a lower second quality, the second quality being associated with a second bit consumption rate lower than the first bit consumption rate.

3. The method of claim 1, further comprising:

presenting the user an option to manually reduce the second bandwidth limit to satisfy the increase in bandwidth consumption of the first application; and in response to receiving an input from the user, reducing the second bandwidth limit of the second application based on the received input.

4. The method of claim 1, wherein reducing the second bandwidth limit further comprises:

stopping the second application from accessing content to free up the first amount of bandwidth; and recording a position of content where the access to content was stopped.

5. The method of claim 4, wherein the second application resumes accessing content at the recorded position.

6. The method of claim 1, wherein the second application is automatically allowed to access content when the first amount of bandwidth is available again.

7. The method of claim 1, wherein the determining the first likelihood and the second likelihood further comprises:

retrieving, from a user profile of the user, a first plurality of media assets accessed by the user using the first application;

determining a first set of characteristics common in the first plurality of media assets;

retrieving, from the user profile, a second plurality of media assets accessed by the user using the second application;

determining a second set of characteristics common in the second plurality of media assets;

determining a type of the media asset;

comparing the type to the first set of characteristics and the second set of characteristics; and based on the comparison, determining the first likelihood and the second likelihood.

8. The method of claim 1, wherein the first bandwidth limit is determined by measuring bandwidth consumption of each of a plurality of instances of the first application running over a plurality of devices.

9. The method of claim 1, further comprising:

communicating the reduction in the second bandwidth limit to a media guidance application, wherein the communication is sent over a first network different from a second network over which the media asset is transmitted.

10. The method of claim 1, wherein detecting an event of interest to a user comprises at least one of:
determining whether the event occurs in a geographic region selected by the user; and
determining the event is associated with a communication that the user has transmitted to a remote server, wherein the remote server transmits the communication to a plurality of other users associated with the first user on the remote server.

11. A system of dynamically adapt network performance parameters for applications, the system comprising:
communications circuitry;
storage circuitry configured to store a first application and a second application; and
control circuitry configured to:
set a first bandwidth limit for the first application for communication over the communications circuitry and a second bandwidth limit for the second application for communication over the communications circuitry;
detect an event of interest to a user;
identify a media asset associated with the event;
determine a first likelihood that the media asset will be accessed using the first application and a second likelihood that the media asset will be accessed using the second application; and
in response to determining that the first likelihood is greater than the second likelihood, reducing the second bandwidth limit by a first amount to increase the first bandwidth limit by the first amount.

12. The system of claim 11, wherein the control circuitry is further configured to:
determine that the second bandwidth limit cannot be reduced as the second application is accessing a second media asset consuming bandwidth, over the communications circuitry, up to the second bandwidth limit;
upon determining that the second bandwidth limit cannot be reduced, determine a first quality associated with a first bit consumption rate of the second media asset; and
reduce the quality of the second media asset from the first quality to a lower second quality, the second quality being associated with a second bit consumption rate lower than the first bit consumption rate.

13. The system of claim 11, further comprising:
input circuitry configured to receive an input from the user;
wherein the control circuitry is further configured to:
present the user an option to manually reduce the second bandwidth limit to satisfy the increase in bandwidth consumption of the first application; and
in response to receiving the input from the user, reduce the second bandwidth limit of the second application based on the received input.

14. The system of claim 11, wherein the control circuitry is further configured, wherein reducing the second bandwidth limit, to:
stop the second application from accessing content to free up the first amount of bandwidth; and
record a position of content where the access to content was stopped.

15. The system of claim 14, wherein the second application resumes accessing content at the recorded position.

16. The system of claim 11, wherein the second application is automatically allowed, by the control circuitry, to access content when the first amount of bandwidth is available again.

17. The system of claim 11, wherein:
the storage circuitry is further configured to store a user profile of the user; and
the control circuitry is further configured, when determining the first likelihood and the second likelihood, to:
retrieve, from the user profile of the user, a first plurality of media assets accessed by the user using the first application;
determine a first set of characteristics common in the first plurality of media assets;
retrieve, from the user profile, a second plurality of media assets accessed by the user using the second application;
determine a second set of characteristics common in the second plurality of media assets;
determine a type of the media asset;
compare the type to the first set of characteristics and the second set of characteristics; and
based on the comparison, determining the first likelihood and the second likelihood.

18. The system of claim 11, wherein the control circuitry is further configured to determine the first bandwidth limit by measuring bandwidth consumption of each of a plurality of instances of the first application running over a plurality of devices.

19. The system of claim 11, wherein the control circuitry is further configured to:
communicate, over the communications circuitry, the reduction in the second bandwidth limit to a media guidance application, wherein the communication is sent over a first network different from a second network over which the media asset is transmitted.

20. The system of claim 11, wherein the control circuitry, when detecting an event of interest to a user, is further configured to at least one of:
determine whether the event occurs in a geographic region selected by the user; and
determine the event is associated with a communication that the user has transmitted to a remote server, wherein the remote server transmits the communication to a plurality of other users associated with the first user on the remote server.

* * * * *